(12) United States Patent
Lee

(10) Patent No.: US 9,782,683 B2
(45) Date of Patent: Oct. 10, 2017

(54) MOTION SIMULATOR

(71) Applicant: MOTION DEVICE INC., Gyeonggido (KR)

(72) Inventor: Jong Chan Lee, Gyeonggi-do (KR)

(73) Assignee: MOTION DEVICE INC., Siheung-si (KR)

( * ) Notice: Subject to any disclaimer, the term of this patent is extended or adjusted under 35 U.S.C. 154(b) by 0 days.

(21) Appl. No.: 15/299,087

(22) Filed: Oct. 20, 2016

(65) Prior Publication Data

US 2017/0113150 A1    Apr. 27, 2017

(30) Foreign Application Priority Data

Oct. 27, 2015  (KR) ......................... 10-2015-0149073

(51) Int. Cl.
| | |
|---|---|
| A63G 31/16 | (2006.01) |
| G09B 9/02 | (2006.01) |
| A63F 13/28 | (2014.01) |
| A63F 13/803 | (2014.01) |

(52) U.S. Cl.
CPC .............. *A63G 31/16* (2013.01); *A63F 13/28* (2014.09); *A63F 13/803* (2014.09); *G09B 9/02* (2013.01); *A63F 2300/302* (2013.01); *A63F 2300/8017* (2013.01)

(58) Field of Classification Search
CPC .......... A63G 31/00; A63G 31/16; G09B 9/00; G09B 9/02; G09B 19/16
USPC ...... 472/59–60, 130; 434/29, 30, 51, 55, 58, 434/59, 61, 62; 463/1
See application file for complete search history.

(56) References Cited

U.S. PATENT DOCUMENTS

| | | | | |
|---|---|---|---|---|
| 5,975,907 | A * | 11/1999 | Advani ................. | A63G 31/16 434/29 |
| 6,733,293 | B2 * | 5/2004 | Baker .................... | G09B 19/16 434/55 |
| 9,186,590 | B2 * | 11/2015 | Lee ........................ | G09B 9/02 |
| 9,353,903 | B2 * | 5/2016 | Kang .................... | A63G 31/16 |

(Continued)

FOREIGN PATENT DOCUMENTS

KR    10-1198255 B1    11/2012

*Primary Examiner* — Kien Nguyen
(74) *Attorney, Agent, or Firm* — Stein IP, LLC

(57) ABSTRACT

A motion simulator capable of being manufactured to have a small size so that an occupied area can be reduced, is provided. The motion simulator includes: an upper frame; a lower frame; a first link portion configured to have a bottom end hinged to one side of a rear end of the lower frame and a top end connected to one side of a rear end of the upper frame so that pitching rotation of the upper frame is performed, and to move one side of the rear end of the upper frame in a vertical direction using a first driving unit; a second link portion configured to have a bottom end hinged to the other side of the rear end of the lower frame and a top end connected to the other side of the rear end of the upper frame so that pitching rotation of the upper frame is performed, and to move the other side of the rear end of the upper frame in the vertical direction using a second driving unit; a third driving unit configured to be provided on the lower frame; and a third link portion configured to support a lower portion of the upper fame so that pitching and rolling rotation of the upper frame is performed, and to move the upper frame in the vertical direction using the third driving unit.

13 Claims, 27 Drawing Sheets

(56) References Cited

U.S. PATENT DOCUMENTS

2005/0277092 A1* 12/2005 Hwang .................. G09B 19/16
                                                      434/55
2010/0028837 A1*  2/2010 Holloway ................ G05G 1/38
                                                      472/130
2011/0177873 A1*  7/2011 Sebelia .................. A63F 13/28
                                                      472/130

* cited by examiner

MOTION SIMULATOR

CROSS-REFERENCE TO RELATED APPLICATION

This application claims priority to and the benefit of Korean Patent Application No. 10-2015-0149073, filed on Oct. 27, 2015, the disclosure of which is incorporated herein by reference in its entirety.

BACKGROUND

1. Field of the Invention

The present invention relates to a motion simulator, and more particularly, to a motion simulator capable of being manufactured to have a small size so that an occupied area can be reduced.

2. Discussion of Related Art

In general, a motion simulator that is a device enabling a user to feel a motion of virtual reality as reality by representing a dynamic change to be suitable for a virtual environment controlled by a computer, is widely used as a game or theater simulator capable of realizing flight simulation or driving simulation, etc. and enabling the user to feel a three-dimensional (3D) effect these days.

The motion simulator performs a 3D motion by a combination of a rectilinear motion and a rotational motion. A motion of an object on a space is carried out by a combination of a rectilinear motion in a forward/backward direction (Z-axis), a left/right direction (X-axis), and an upward/downward direction (Y-axis), and a rotational motion including rolling in which the Z-axis is the center of rotation, pitching in which the X-axis is the center of rotation, and yawing in which the Y-axis is the center of rotation.

A motion simulator as a conventional motion simulator is disclosed in Korean Patent Registration No. 10-1198255. The conventional motion simulator enables the user to feel a more realistic virtual environment by realizing the motion simulator capable of making maximum 5-degree-of-freedom motion. However, the conventional motion simulator has a structure in which the motion simulator having a small size cannot be realized.

SUMMARY OF THE INVENTION

The present invention is directed to a motion simulator capable of being manufactured to have a small size so that an occupied area can be reduced.

According to an aspect of the present invention, there is provided a motion simulator including: an upper frame configured to have a chair on which a user sits; a lower frame configured to have a bottom surface supported on a floor; a first link portion configured to have a bottom end hinged to one side of a rear end of the lower frame and a top end connected to one side of a rear end of the upper frame so that pitching rotation of the upper frame is performed, and to move one side of the rear end of the upper frame in a vertical direction using a first driving unit; a second link portion configured to have a bottom end hinged to the other side of the rear end of the lower frame and a top end connected to the other side of the rear end of the upper frame so that pitching rotation of the upper frame is performed, and to move the other side of the rear end of the upper frame in the vertical direction using a second driving unit; a third driving unit configured to be provided on the lower frame; and a third link portion configured to support a lower portion of the upper fame so that pitching and rolling rotation of the upper frame is performed, and to move the upper frame in the vertical direction using the third driving unit.

The third driving unit is provided on the lower frame and provides a transferring force in a forward/backward direction, and the third link portion comprises a moving link member having a bottom end hinged to the third driving unit so that one end of the moving link member is movable in the forward/backward direction using the third driving unit, and a fixed link member having one end hinged to the moving link member and the other end hinged to the lower frame, and a connection portion of the moving link member and the fixed link member supports the lower portion of the upper frame, and a vertical motion of the upper frame is performed by forward/backward movement of the moving link member.

The third driving unit is provided on the lower frame, provides a transferring force in a forward/backward direction, comprises a screw including a first screw portion and a second screw portion of which directions of screw threads formed on outer circumferential surfaces of the first and second screw portions are opposite to each other, and a motor for rotating the screw, and the third link portion comprises a first moving link member including a first moving body and a second moving body coupled to the first screw portion and the second screw portion through the screw threads, a bottom end of the first moving link member hinged to the first moving body, and a second moving link member having a bottom end hinged to the second moving body, and a connection portion of the first moving link member and the second moving link member supports the lower portion of the upper frame, and when the screw is rotated by the motor, the first moving body and the second moving body are close to each other or spaced apart from each other so that a vertical motion of the upper frame is performed.

A slide portion is provided between the third link portion and the lower portion of the upper fame so that a connection portion of the third link portion and the upper frame makes slide movement in the forward/backward direction.

The third driving unit comprises a motor providing a rotational driving force, a screw that is rotated by driving of the motor and has a screw thread formed on an outer circumferential surface of the screw in a longitudinal direction, and a screw support member rotatably supporting an end of the screw, and a moving body is provided in such a way that a screw thread is formed on an inner circumferential surface through which the screw passes, and moves in the forward/backward direction according to rotation of the screw, and a front end of the moving link member is hinged to the fixed link member so that pitching rotation of the moving link member is performed, and a rear end of the moving link member is hinged to the moving body so that pitching rotation of the moving link member is performed.

The moving body and the moving link member are hinged to each other by a hinge shaft, and a moving roller that rotates in contact with the lower frame when the moving roller moves in the forward/backward direction, is coupled to the moving body.

A center of the hinge shaft is located at the same height as a center of the screw.

A separation space in a vertical direction is formed in the screw support member so that vertical displacement of an end of the screw is absorbed in the separation space.

The slide portion comprises: a first slide support member and a second slide support member configured to be spaced apart from each other in the forward/backward direction and to be coupled to the lower portion of the upper frame; a rod-shaped slide shaft configured to connect the first slide support member and the second slide support member; and a slide moving member, which is provided between the first slide support member and the second slide support member, through which the slide shaft passes, and which is guided by the slide shaft according to forward/backward and vertical movement of the third link portion and moves in the forward/backward direction.

A ball joint is provided between the slide moving member and the slide shaft so that the slide moving member is freely rotated.

The slide shaft is supported by a slide roller that rotates when slide movement in the forward/backward direction is performed.

A plurality of slide rollers are provided in the longitudinal direction of the slide shaft.

The slide roller has a concave groove-shaped portion on which the slide shaft is mounted.

The first link portion and the second link portion are inclined at an acute angle with respect to a simulator central line having a length in the forward/backward direction.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a configuration and an operation according to example embodiments of the present invention will be described in detail below with reference to the accompanying drawings.

First Embodiment

Figure 1:
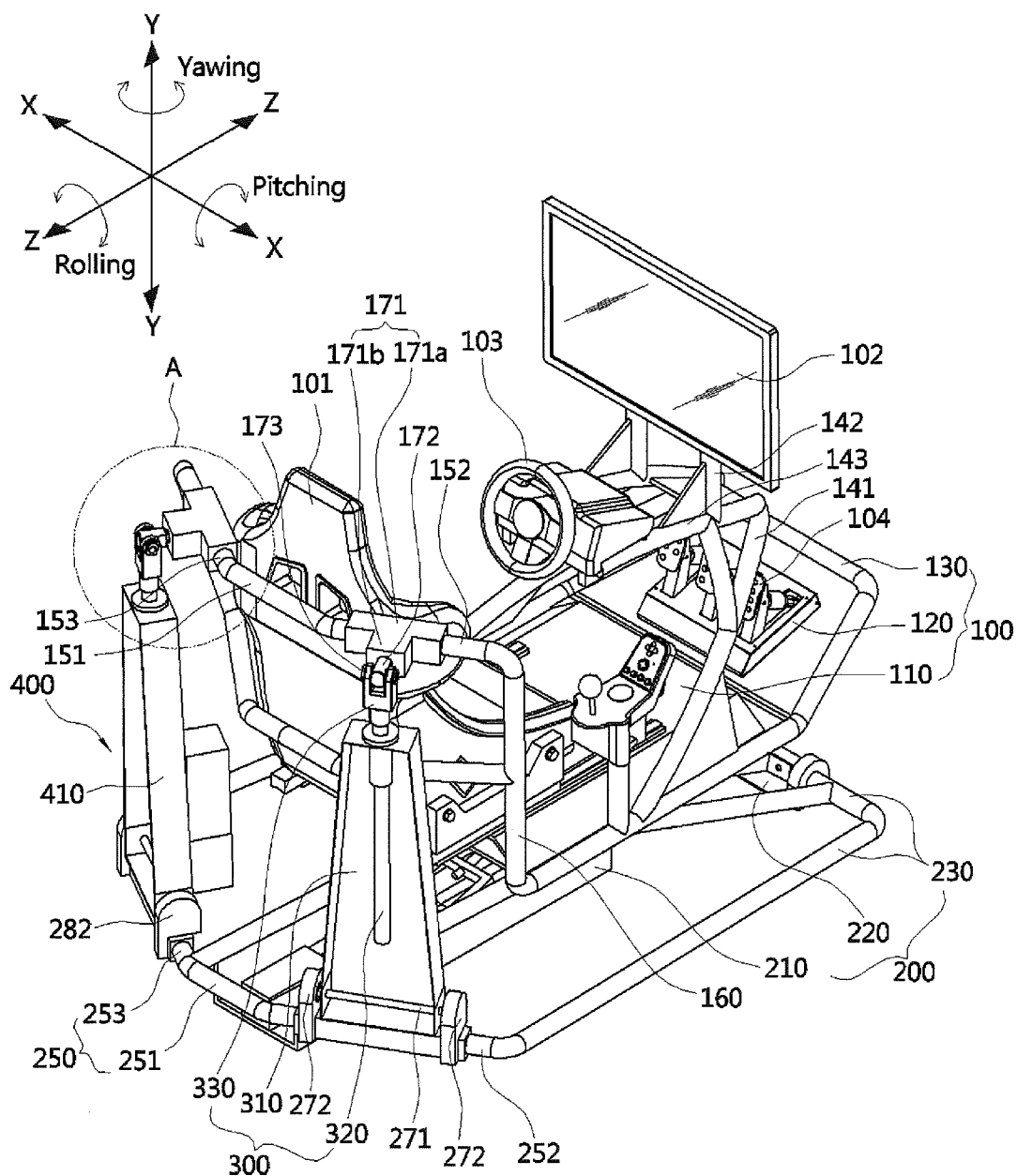
FIG. 1 is a perspective view of a motion simulator according to a first embodiment of the present invention.
Figure 2:
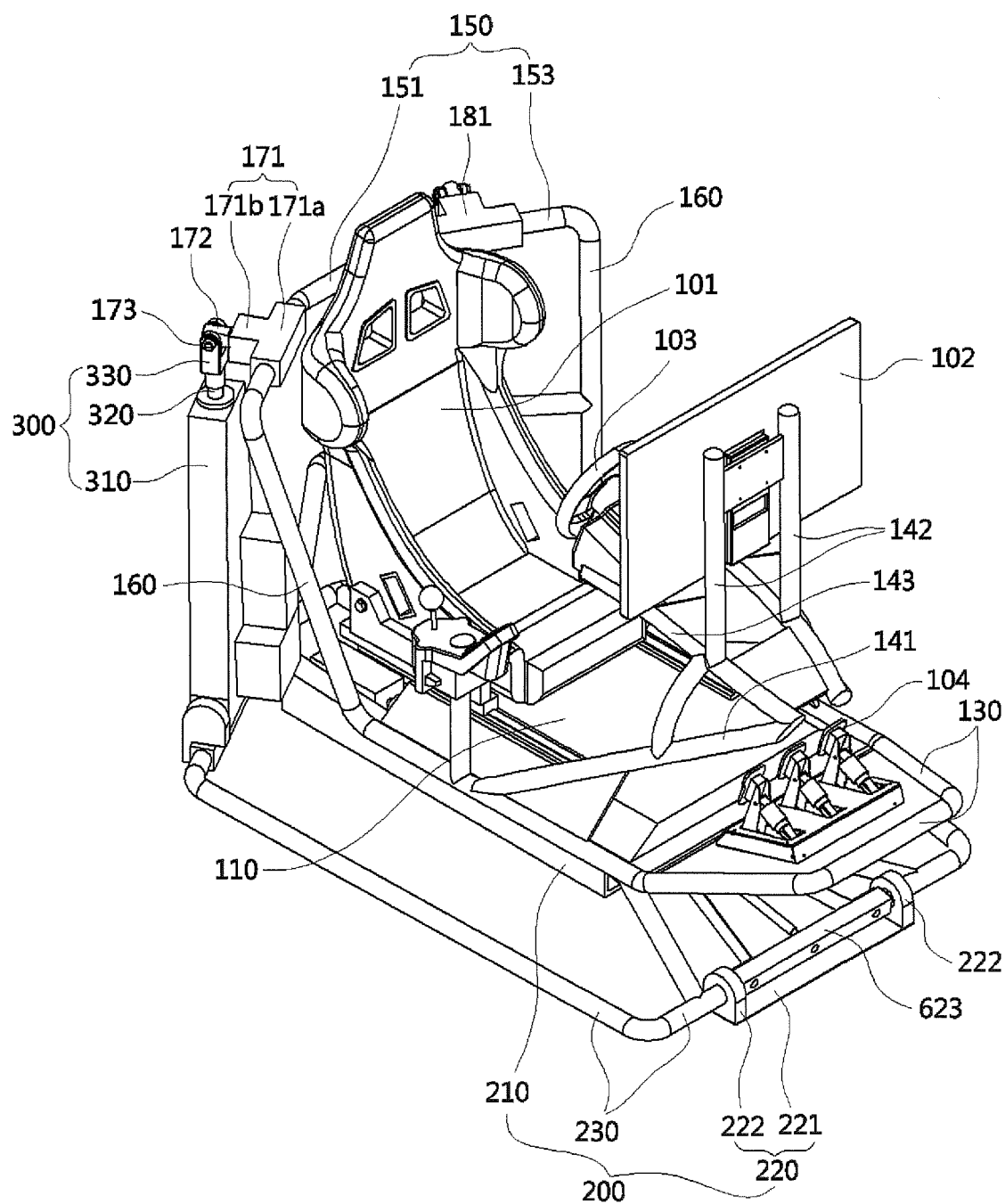
FIG. 2 is a perspective view of the motion simulator of FIG. 1 at a different angle from that of FIG. 1.
Figure 3:
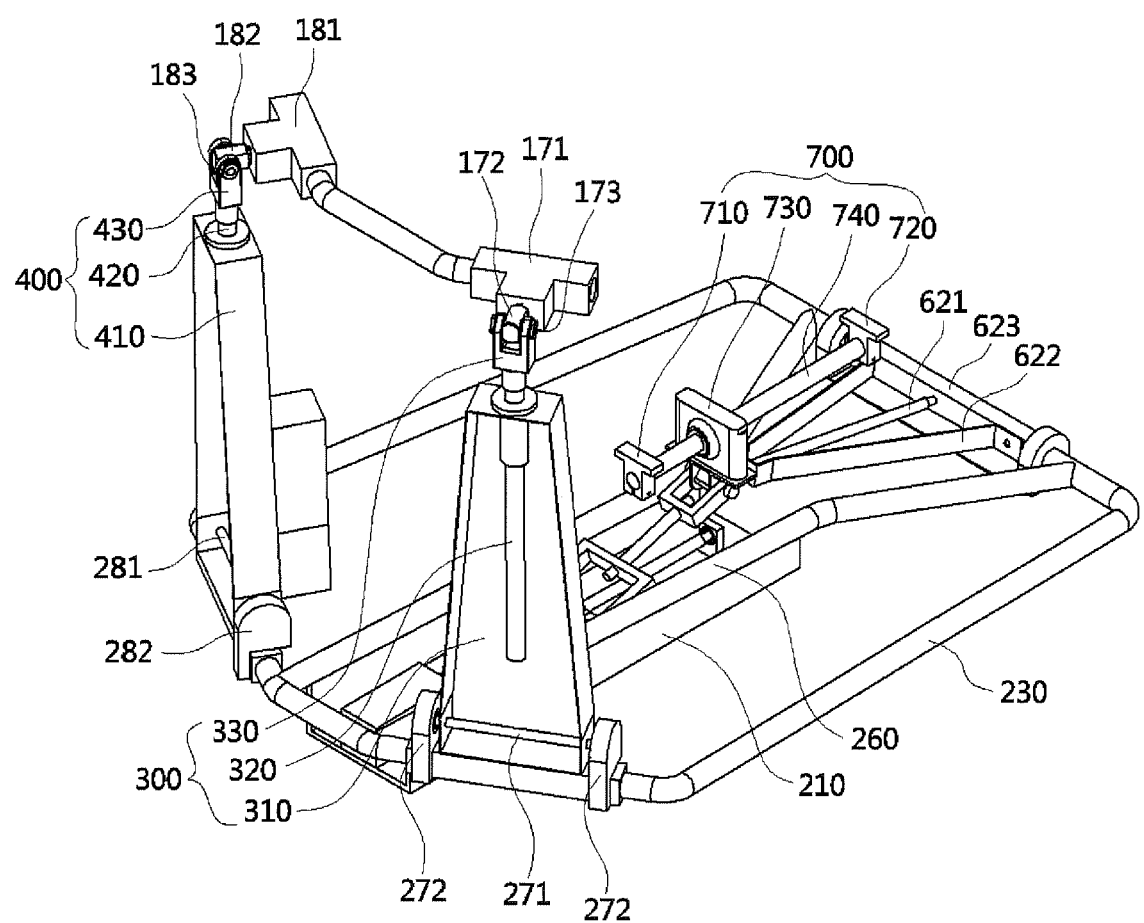
FIG. 3 is a perspective view of a state in which an upper frame is removed from the motion simulator of FIG. 1.
Figure 4:
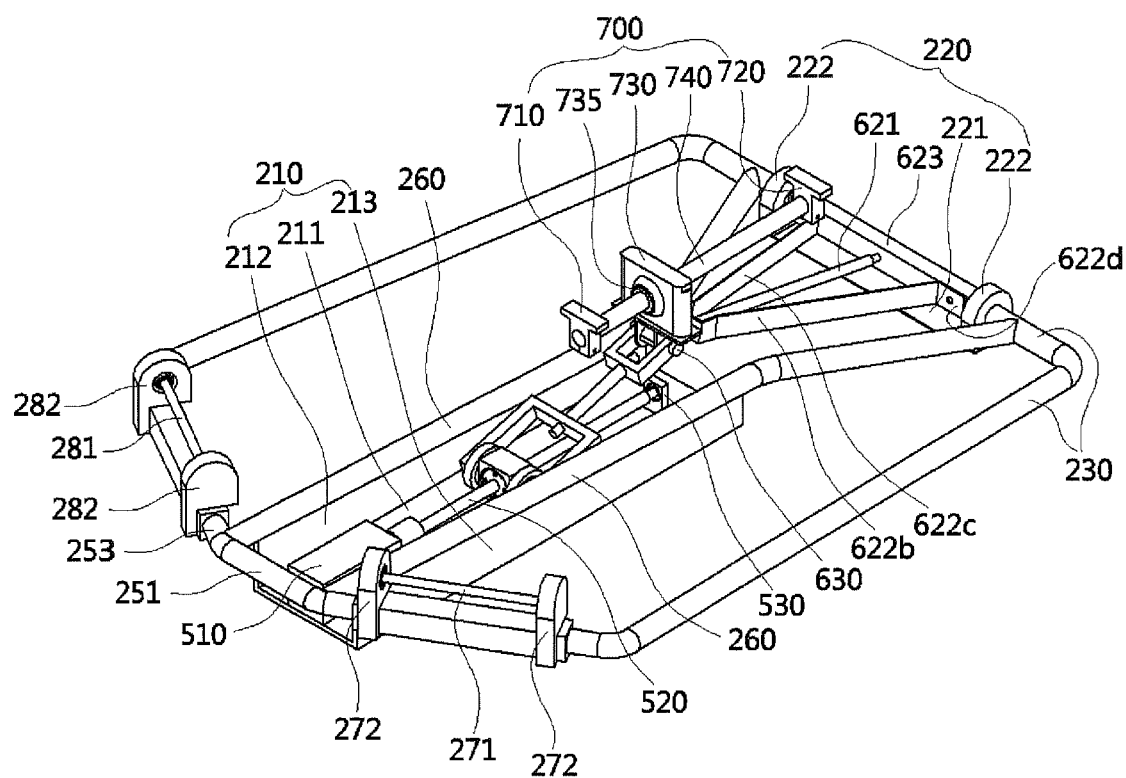
FIG. 4 is a perspective view of a state in which the upper frame, a first link portion and a second link portion are removed from the motion simulator of FIG. 1.
Figure 5:
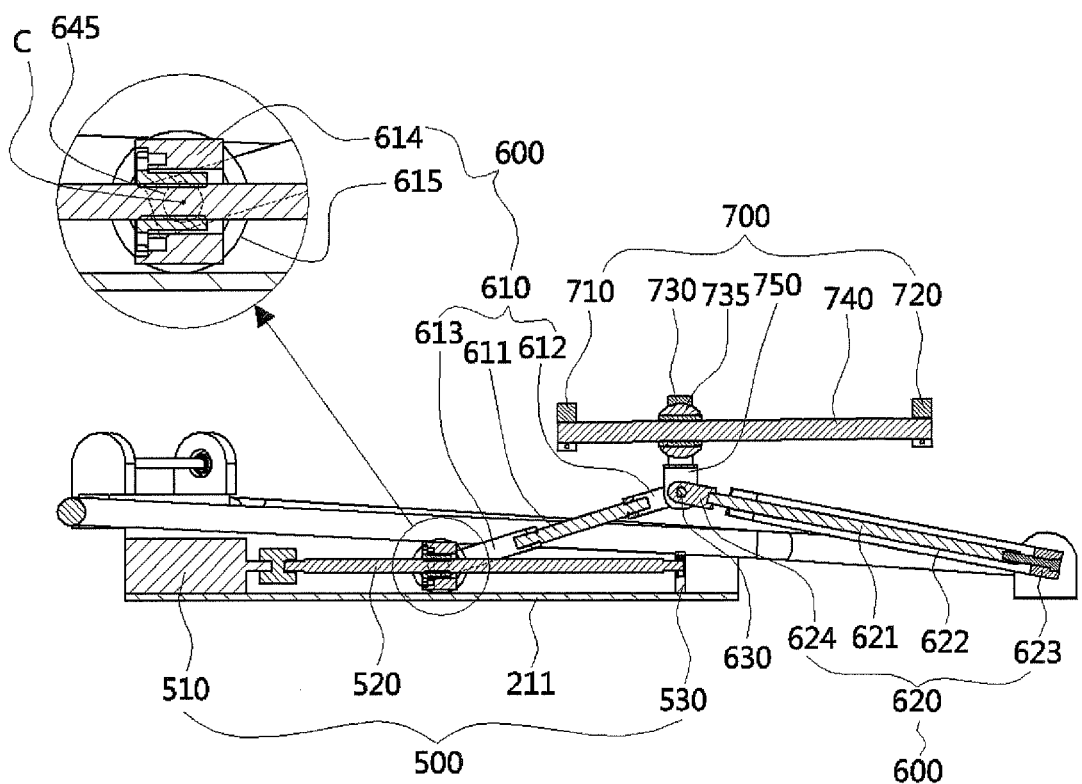
FIG. 5 is a cross-sectional view of a cross-sectional structure in a direction of a central line of the simulator in the state of FIG. 4.
Figure 6:
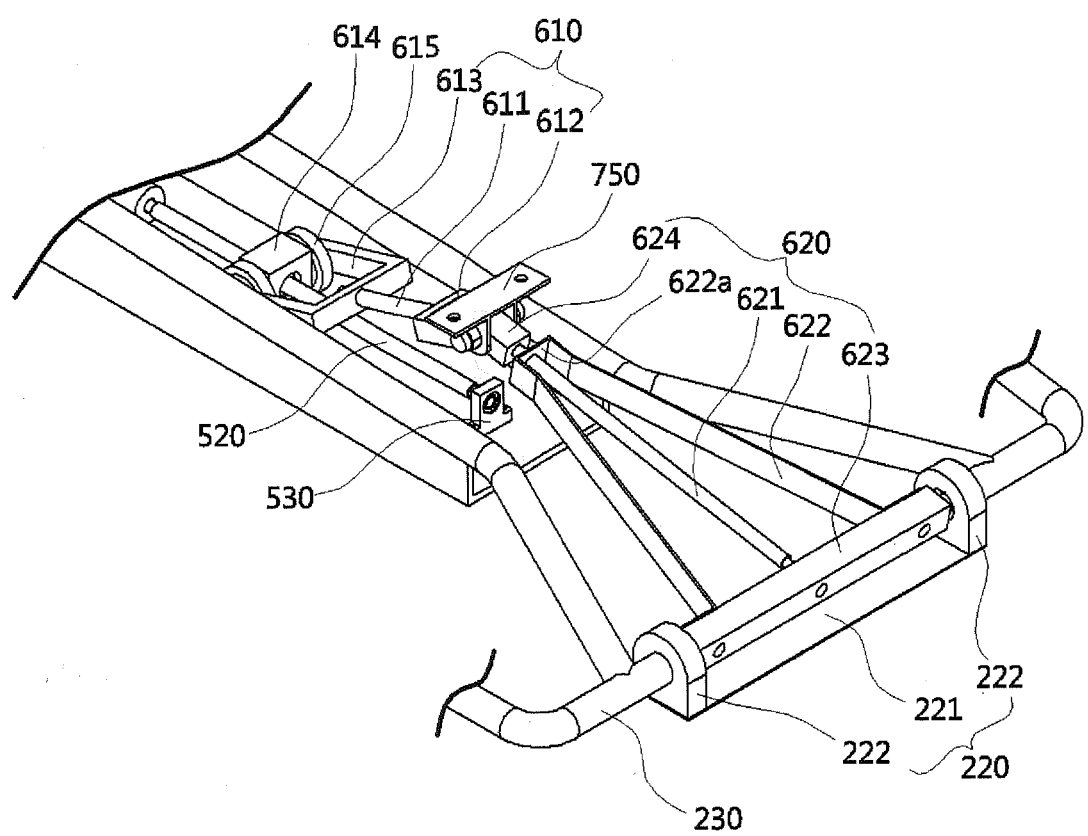
FIG. 6 is a perspective view of a third link portion of the motion simulator of FIG. 1.
Figure 7:
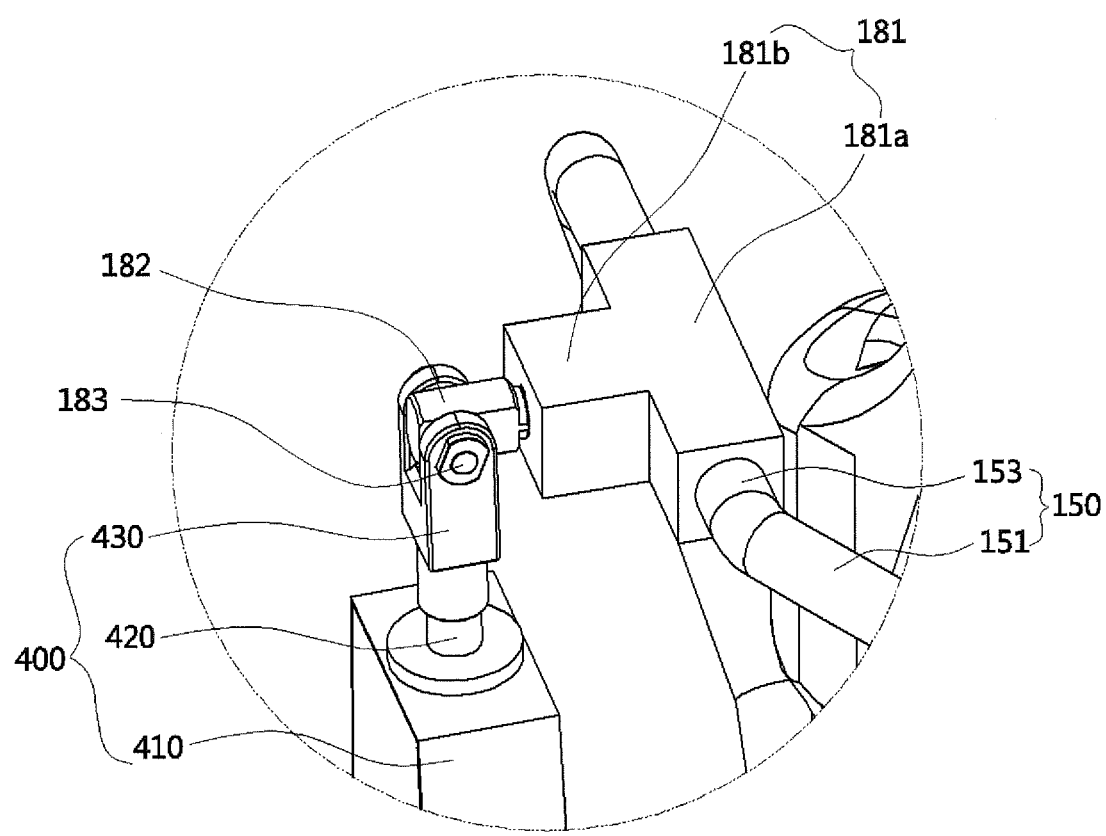
FIG. 7 is a perspective view of a connection structure of the second link portion and the upper frame of the motion simulator of FIG. 1.

A motion simulator according to a first embodiment of the present invention will be described with reference to FIGS. 1 through 7. Hereinafter, when describing the direction of a motion, as indicated in FIG. 2, rolling will be described as a rotational motion in which a forward/backward direction (Z-axis) is a center of rotation, pitching will be described as a rotational motion in which a left/right direction (X-axis) is a center of rotation, and yawing will be described as a rotational motion in which an upward/downward direction (Y-axis) is a center of rotation.

The motion simulator according to the present invention includes an upper frame 100, a lower frame 200, a first link portion 300 that moves one side of a rear end of the upper frame 100 in a vertical direction using a first driving unit, a second link portion 400 that moves the other side of the rear end of the upper frame 100 in the vertical direction using a second driving unit, a third driving unit 500 disposed on the lower frame 200, and a third link portion 600 that supports a lower portion of the upper frame 100 so that pitching and rolling rotation of the upper frame 100 can be performed and that moves the upper frame 100 in the vertical direction using the third driving unit 500.

The third driving unit 500 provides a transferring force in the forward/backward direction, and the third link portion 600 includes a moving link member 610 that is movable in the forward/backward direction by the third driving unit 500, and a fixed link member 620 connected to the moving link member 610.

Here, the front is a user's eyes direction in which the user sits on a chair 101, and the rear is the user's back direction.

The chair 101 on which the user sits, a monitor 102 that provides a virtual environment caused by the user's manipulation as a video, and a handle 103 and a pedal 104 to be manipulated by the user so as to provide the virtual environment are disposed on the upper frame 100. These configurations may be replaced with other configurations according to the use of the motion simulator.

The upper frame 100 includes a chair frame 110 on which the chair 101 is loaded, a pedal support frame 120 on which the pedal 104 is loaded, a first front frame 130 having a shape of a rod so as to surround outer circumferences of the chair frame 110 and the pedal support frame 120 in a t-shape so that the chair frame 110 and the pedal support frame 120 can be integrally coupled into the first front frame 130, a pair of left and right, rod-shaped monitor fixing frames 142 having a predetermined length in a vertical direction so as to fix the monitor 102, a pair of left and right, rod-shaped handle fixing frames 143 that extend from bottom ends of the monitor fixing frames 142 backwards, so as to fix the handle 103, a connection frame 141 for connecting between the first front frame 130, the monitor fixing frames 142 and the handle fixing frames 143, a pair of left and right first intermediate frames 160 that extend from a rear end of the first front frame 130 upwards by a predetermined length, and a first rear frame 150 that connects between top ends of the first intermediate frames 160.

The first rear frame 150 includes a first rear intermediate frame 151 having a predetermined length in a left/right direction perpendicular to the forward/backward direction, a first link portion support frame 152 that slantly extends from an end of one side of the first rear intermediate frame 151 forwards, and a second link portion support frame 153 that slantly extends from an end of the other side of the first rear intermediate frame 151 forwards so as to face the first link portion support frame 152.

A central line (hereinafter, referred to as a 'simulator central line') having a length in the forward/backward direction of the motion simulator according to the present invention and the first link portion support frame 152 form an acute angle, and the simulator central line and the second link portion support frame 153 also form an acute angle, wherein the first link portion support frame 152 and the second link portion support frame 153 have symmetrical shapes.

A first rear frame connection member 171 and a first link portion connection pin 172 for being hinged to a top end of the first link portion 300 are disposed on the first link portion support frame 152, and a second rear frame connection member 181 and a second link portion connection pin 182 for being hinged to a top end of the second link portion 400 are disposed on the second link portion support frame 153.

The first rear frame connection member 171 and the second rear frame connection member 181 having the same shape include frame coupling portions 171a and 181a through which the first link portion support frame 152 and the second link portion support frame 153 pass in a longitudinal direction, and connection pin coupling portions 171b and 181b that protrude from central portions of the frame coupling portions 171a and 181a in an orthogonal horizontal direction and have a T shape.

One ends of the first link portion connection pin 172 and the second link portion connection pin 182 are fixedly coupled to the connection pin coupling portions 171b and 181b, and the other ends thereof are hinged to the top ends of the first link portion 300 and the second link portion 400 using hinge pins 173 and 183.

The first link portion 300 includes a first link member 310 having a predetermined length in the vertical direction, a first rod 320 that slides inside the first link member 310 by a first driving unit (not shown), and a first link portion connection member 330 connected to an upper portion of the first rod 320 so as to perform pitching rotation around the first link portion connection pin 172.

A bottom end of the first link member 310 is connected to the lower frame 200 in a hinge structure so that pitching rotation of the first link member 310 can be performed.

The second link portion 400 includes a second link member 410 having a predetermined length in the vertical direction, a second rod 420 that slides inside the second link member 410 by a second driving unit (not shown), and a second link portion connection member 430 connected to an upper portion of the second rod 420 so as to perform pitching rotation around the second link portion connection pin 182.

A bottom end of the second link member 410 is connected to the lower frame 200 in a hinge structure so that pitching rotation of the second link member 410 can be performed.

The first link member 310 and the second link member 410 have an approximately trapezoidal shape, and the first and second rods 320 and 420 are disposed moveably in the vertical direction in the center of an upper base of the trapezoid, and the first and second link portion connection members 330 and 430 are hinged to top ends of the first and second rods 320 and 420 and are hinged to both ends of a lower base of the trapezoid. In this case, an upper base and a lower base of the first link member 310 are in the same direction as that of the first link portion support frame 152 and are inclined at an acute angle with respect to the simulator central line, and an upper base and a lower base of the second link member 410 are in the same direction as that of the second link portion support frame 153.

According to this structure, the first link member 310 and the second link member 410 are inclined to face each other in a direction of a center of the motion simulator. Thus, when the upper frame 100 performs pitching rotation, the second link member 410 supports the first link member 310 not to fall forwards, and the first link member 310 supports the second link member 410 not to fall forwards, and therefore the first link member 310, the second link member 410, and the upper frame 100 can be prevented from falling forwards even though there is no additional support structure.

The first driving unit and the second driving unit may be motors.

The lower frame 200 includes a first bottom support frame 210 on which the third driving unit 500 is loaded and of which a bottom surface is supported by the floor, a second bottom support frame 220 to which a front end of the fixed link member 620 is hinged and of which a bottom surface is supported by the floor, a rod-shaped second front frame 230 having a front portion coupled to both ends of the second bottom support frame 220 and having an approximately ⊏-shape, a rod-shaped second rear frame 250 that connects both ends of the rear of the second front frame 230, and a second intermediate frame 260 that connects between the second front frame 230 and the second rear frame 250 and is coupled to an upper portion of the first bottom support frame 210.

The first bottom support frame 210 having a shape of a rectangular box in which an upper portion and the front and the rear of the rectangular box are opened, includes a bottom support portion 211 of which a bottom surface is supported by the floor, and a pair of lateral bodies 212 and 213 that are bent in an upward direction and extend from both ends of the bottom support portion 211.

The third driving unit 500 is loaded on the bottom support portion 211, and the second intermediate frame 260 is coupled to top ends of the lateral bodies 212 and 213 in a longitudinal direction.

The second bottom support frame 220 includes a bottom support portion 221 having a length in a left/right direction so that a bottom surface of the bottom support portion 221 is supported by the floor, and a pair of lateral support portions 222, which are formed from both ends of the bottom support portion 221 upwards to have a height and to which the second front frame 230 is coupled.

A lower frame connection member 623 is disposed between the pair of lateral support portions 222.

The second rear frame 250 includes a second rear intermediate frame 251 having a predetermined length in the left/right direction perpendicular to the forward/backward longitudinal direction, a third link portion support frame 252 that is inclined in the same direction as that of the first link member 310 at one end of the second rear intermediate frame 251, and a fourth link portion support frame 253 that is inclined in the same direction as that of the second link member 410 at the other end of the second rear intermediate frame 251.

The third link portion support frame 252 and the fourth link portion support frame 253 form an acute angle with respect to the simulator central line, and the third link portion support frame 252 and the fourth link portion support frame 253 have symmetrical shapes.

A hinge shaft 271 through which the third link portion support frame 252 is hinged to a bottom end of the first link portion 300, and a pair of lateral support portions 272 that support both ends of the hinge shaft 271 and are integrally coupled to the third link portion support frame 252, are disposed on the third link portion support frame 252. A hinge shaft 281 through which the fourth link portion support frame 253 is hinged to a bottom end of the second link portion 400, and a pair of lateral support portions 282 that support both ends of the hinge shaft 281 and are integrally coupled to the fourth link portion support frame 253, are disposed on the fourth link portion support frame 253.

In order to provide a transferring force in the forward/backward direction to a rear end of the moving link member 610, the third driving unit 500 includes a motor 510 that provides a rotational driving force, a screw 520 that is rotated by the rotational driving force of the motor 510 and has a screw thread formed on an outer circumferential surface of the screw 520 in the longitudinal direction, and a screw support member 530 that rotatably supports a front end of the screw 520.

The screw 520 passes through a moving body 614, and a screw thread is formed between the outer circumferential surface of the screw 520 and a passed inner circumferential surface of the moving body 614, respectively, and because rotation in the left/right direction is prevented by a moving roller 615 coupled to both ends of the moving body 614, the moving body 614 moves in the forward/backward direction when the screw 520 is rotated.

The moving link member 610 includes a rod-shaped first link shaft 611 having a predetermined length in the forward/backward direction, a ⊏-shaped first link shaft front-end connection member 612 coupled to a front end of the first link shaft 611, and a ⊏-shaped first link shaft rear-end connection member 613 coupled to a rear end of the first link shaft 611.

The moving body 614 is hinged to a rear end of the first link shaft rear-end connection member 613 using a hinge shaft 645. The moving roller 615 is disposed between the moving body 614 and the first link shaft rear-end connection member 613. The hinge shaft 645 passes through the first link shaft rear-end connection member 613, the moving roller 615, and the moving body 614. A center C of the hinge shaft 645 and a center of the screw 520 are located at the same height from the ground.

When the center C of the hinge shaft 645 that connects the moving link member 610 and the moving body 614 and the center of the screw 520 are not located at the same height, a rotational force is applied to the moving body 614, and an excessive frictional force is generated between the moving roller 615 and a floor surface. Thus, the center C of the hinge shaft 645 and the center of the screw 520 are located at the same height so that an excessive frictional force is prevented from being generated between the moving roller 615 and the floor surface and smooth movement of the moving roller 615 can be performed.

A front end of the first link shaft front-end connection member 612 is hinged to the fixed link member 620 by a pin 630 so that pitching rotation of the first link shaft front-end connection member 612 can be performed.

The rear end of the first link shaft rear-end connection member 613 is hinged to the moving body 614 so that pitching rotation of the first link shaft rear-end connection member 613 can be performed.

A pair of moving rollers 615 are disposed at both ends of the moving body 614, prevent rotation of the moving body 614 in the left/right direction caused by rotation of the screw 520, and rotate while the moving roller 615 is in a contact state with a top surface of the bottom support portion 211 of the first bottom support frame 210 when the moving body 614 moves in the forward/backward direction.

The fixed link member 620 includes the lower frame connection member 623 connected to the lower frame 200 so as to perform pitching rotation, a second link shaft rear-end connection member 624 hinged to the pin 630, a second link shaft 621 having a rear end connected to the second link shaft rear-end connection member 624 and a front end coupled to the lower frame connection member 623, and a second link shaft support member 622 having a rear end supporting the second link shaft 621 and a front end fixedly coupled to the lower frame connection member 623.

The second link shaft 621 having a shape of a rod having a length in the forward/backward direction has the front end coupled to the lower frame connection member 623 and the rear end coupled to the second link shaft rear-end connection member 624.

A rear end of the second link shaft rear-end connection member 624 is hinged to the moving link member 610 by the pin 630 so that pitching rotation of the fixed link member 620 can be performed.

The second link shaft support member 622 includes a front-end portion 622a through which the second link shaft 621 passes, a pair of left and right intermediate portions 622b and 622c that extend from both ends of the front-end portion 622a forwards, and a pair of rear-end portions 622d that extend from front ends of the intermediate portions 622b and 622c in the left/right direction and are coupled to the lower frame connection member 623 by a fastening member.

A distance between one side of the intermediate portion 622b and the other side of the intermediate portion 622c is gradually increased from backwards to forwards.

A shaft (not shown) is interposed between the lower frame connection member 623 and the second front frame 230 in the left/right longitudinal direction of the lower frame connection member 623 so that pitching rotation of the lower frame connection member 623 can be performed with respect to the second front frame 230.

A slide portion 700 is disposed on top of a portion in which the moving link member 610 and the fixed link member 620 are connected to each other, and the upper frame 100 is loaded on the slide portion 700 so that the moving link member 610 and the fixed link member 620 support a load of the upper frame 100.

The slide portion 700 is used to maintain the coupled state of the upper frame 100 and the third link portion 600 so that pitching and rolling motions of the upper frame 100 can be performed when the first driving unit, the second driving unit and the third driving unit 500 operate.

The slide portion 700 is provided so that the connection portion of the moving link member 610 and the fixed link member 620 is slidable in the forward/backward direction. The slide portion 700 includes a first slide support member 710, a second slide support member 720, a slide moving member 730, a slide shaft 740, and a slide portion support member 750.

The first slide support member 710 is coupled to a bottom surface of the chair frame 110, and the second slide support member 720 is spaced apart from the first slide support member 710 in the forward direction and is coupled to the bottom surface of the chair frame 110.

A rear end of the slide shaft 740 having a rod shape is coupled to the first slide support member 710, and a front end of the slide shaft 740 is coupled to the second slide support member 720.

The slide moving member 730 is guided by the slide shaft 740 and is slidable in the forward/backward direction when the slide shaft 740 passes through the center of the slide moving member 730 and the connection portion of the moving link member 610 and the fixed link member 620 that are the third link portion 600 is moved in the upward/downward direction or in the forward/backward direction.

A linear bush 735 is interposed between an inner circumferential surface of a perforation hole of the slide moving member 730 and an outer circumferential surface of the slide shaft 740.

A ball joint may also be provided between the slide moving member 730 and the slide shaft 740 so that the slide moving member 730 can be freely rotated.

The slide moving member 730 is coupled to a top surface of the slide portion support member 750 and is moved together with the slide moving member 730 in the forward/backward direction, and the second link shaft rear-end connection member 624 and the first link shaft front-end connection member 612 are connected to a lower side of the slide portion support member 750 by the pin 630.

An operation of the motion simulator according to the first embodiment of the present invention will be described with reference to FIGS. 8 through 12.

Figure 8:
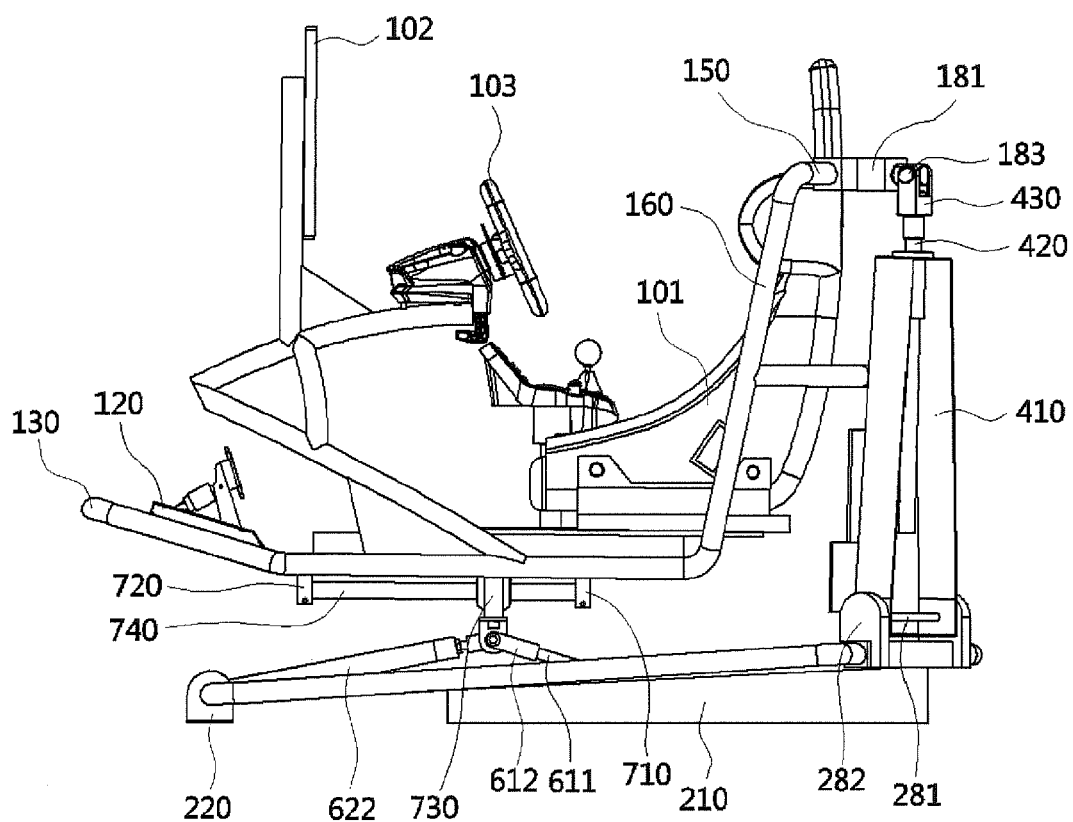
FIG. 8 is a view of a state before the first through third link portions of the motion simulator of FIG. 1 operate.

Referring to FIG. 8, the first driving unit and the second driving unit do not operate so that the first rod 320 and the second rod 420 are not moved up but are placed in a bottommost position, and the connection portion of the moving link member 610 and the fixed link member 620 is placed in the bottommost position.

Figure 9:
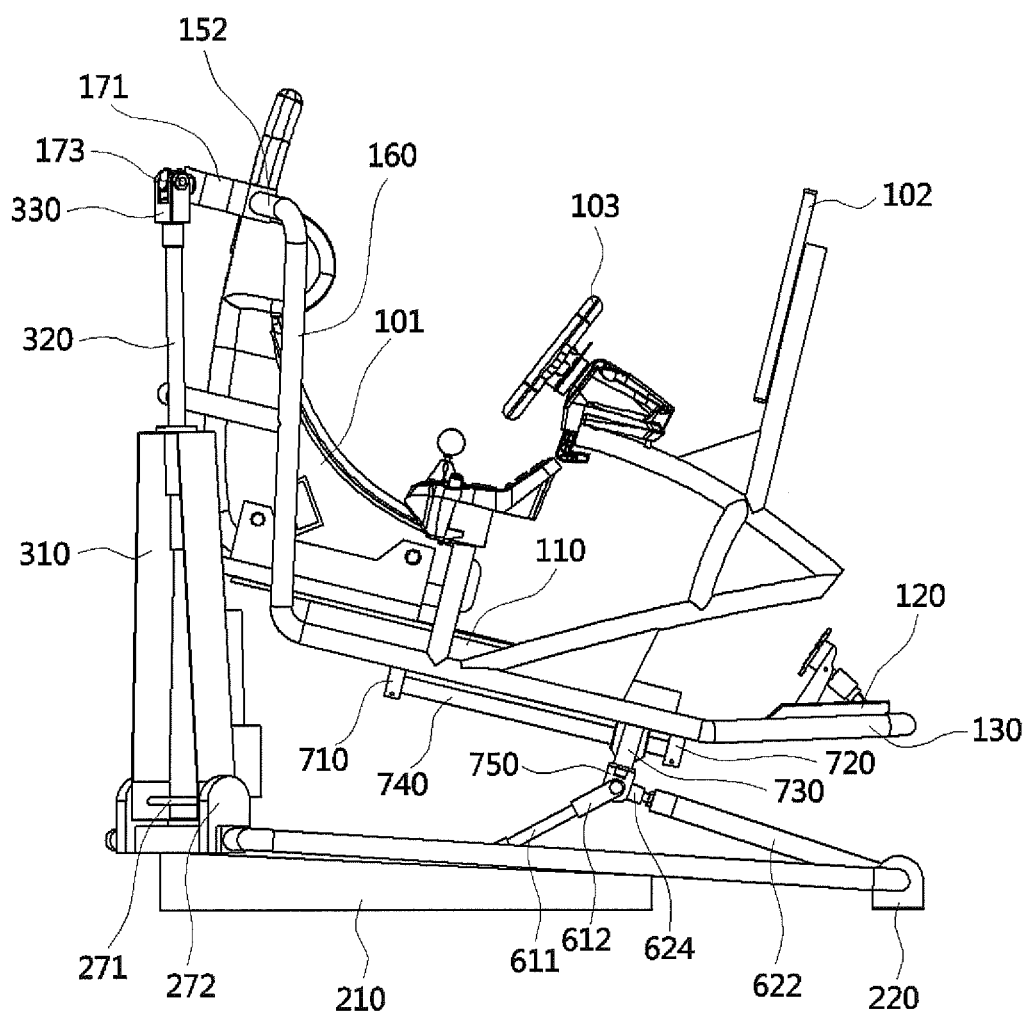
FIG. 9 is a view of a state in which the rear of the upper frame is lifted by a first driving unit and a second driving unit of the motion simulator of FIG. 1.

Referring to FIG. 9, when the first driving unit and the second driving unit operate and the first rod 320 and the second rod 420 are moved up from the position of FIG. 8, the rear of the upper frame 100 and the rear of the chair 101 loaded on the upper frame 100 are lifted. In this case, when the third driving unit 500 operates and the position of the moving link member 610 is adjusted, an inclined angle of the upper frame 100 may be adjusted. The slide moving member 730 is slid along the slide shaft 740 and is placed ahead compared to the position of FIG. 8.

Figure 10:
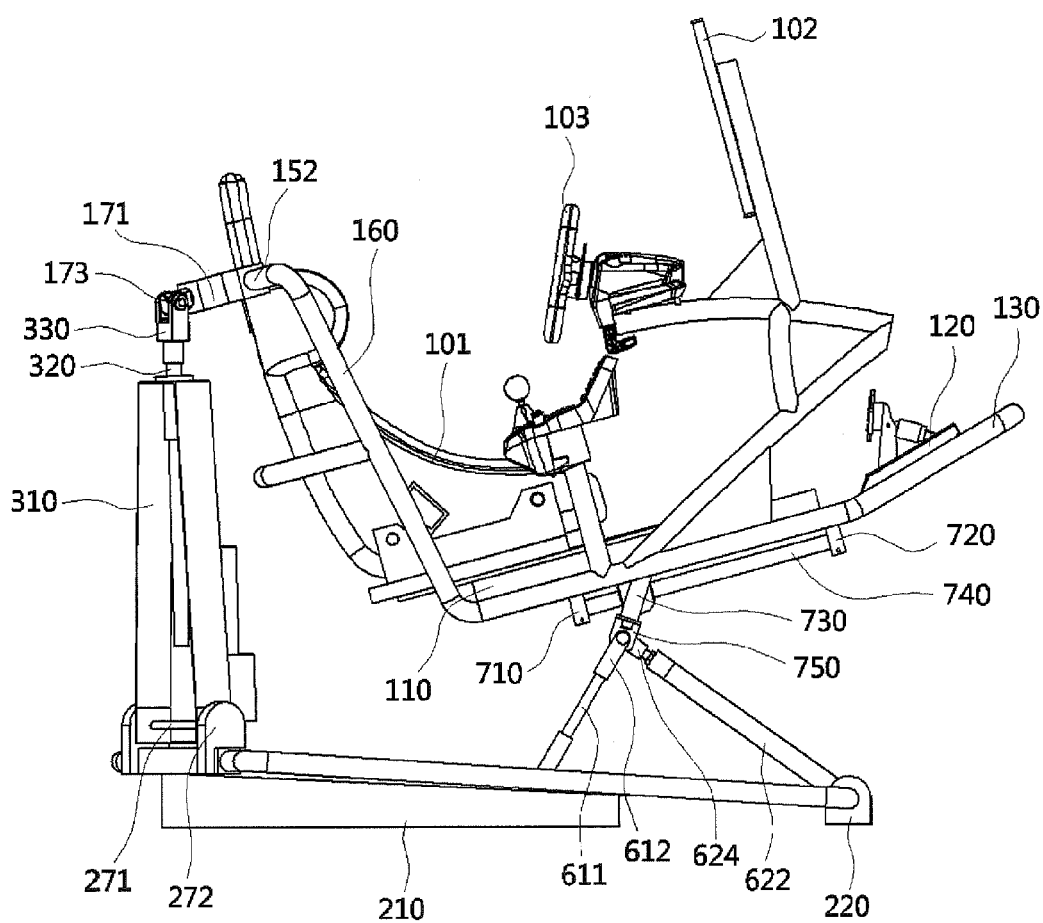
FIG. 10 is a view of a state in which the front of the upper frame is lifted by a third driving unit of the motion simulator of FIG. 1.

Referring to FIG. 10, when the first rod 320 and the second rod 420 are not moved up but are placed in the bottommost position and the motor 510 is driven to move the moving link member 610 forwards, the connection portion of the moving link member 610 and the fixed link member 620 is moved up, and the front of the upper frame 100 is lifted. In this case, the slide moving member 730 is slid along the slide shaft 740 and is placed backwards compared to the position of FIG. 8. Also, the slide moving member 730 and the slide shaft 740 can be rotated relative to each other, and the upper frame 100 can be unilaterally inclined.

Figure 11:
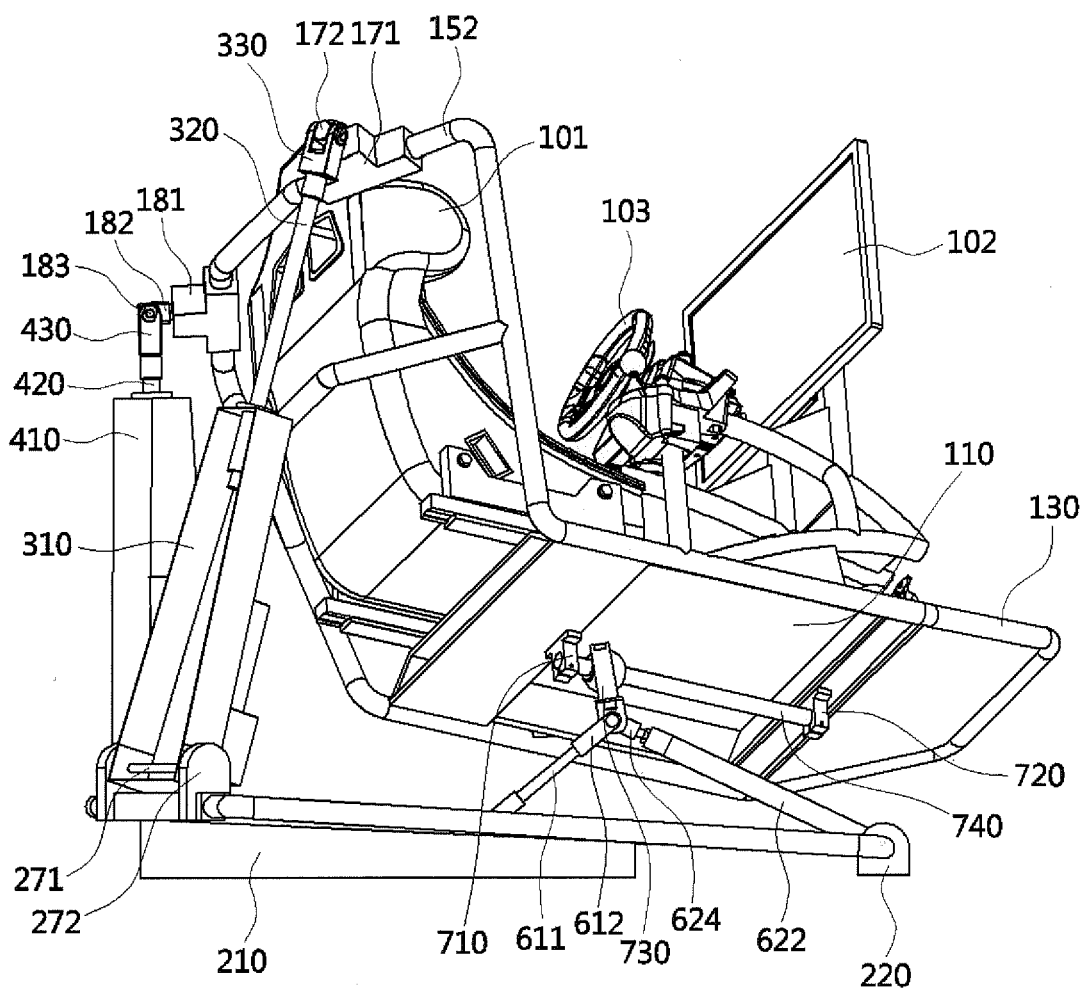
FIG. 11 is a view of a state in which a first rod is moved up by the first driving unit of the motion simulator of FIG. 1 and the upper frame is inclined to the left.
Figure 12:
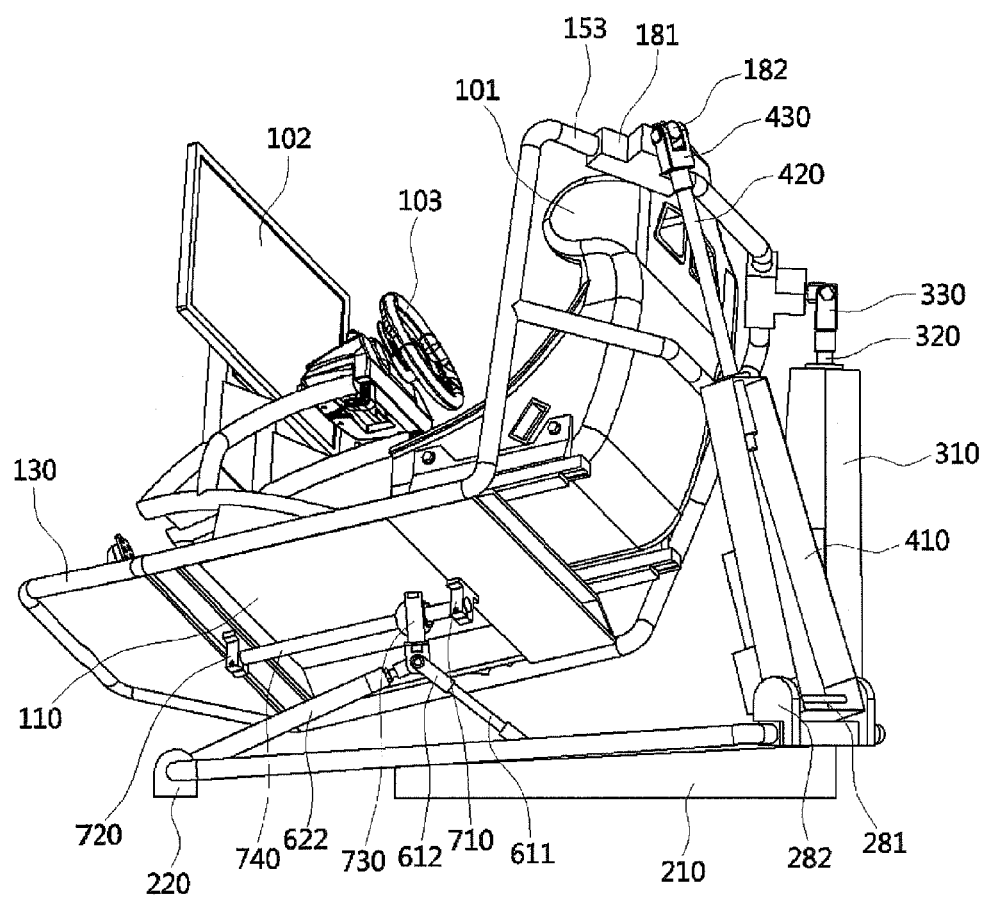
FIG. 12 is a view of a state in which a second rod is moved up by the second driving unit of the motion simulator of FIG. 1 and the upper frame is inclined to the right.
Figure 13:
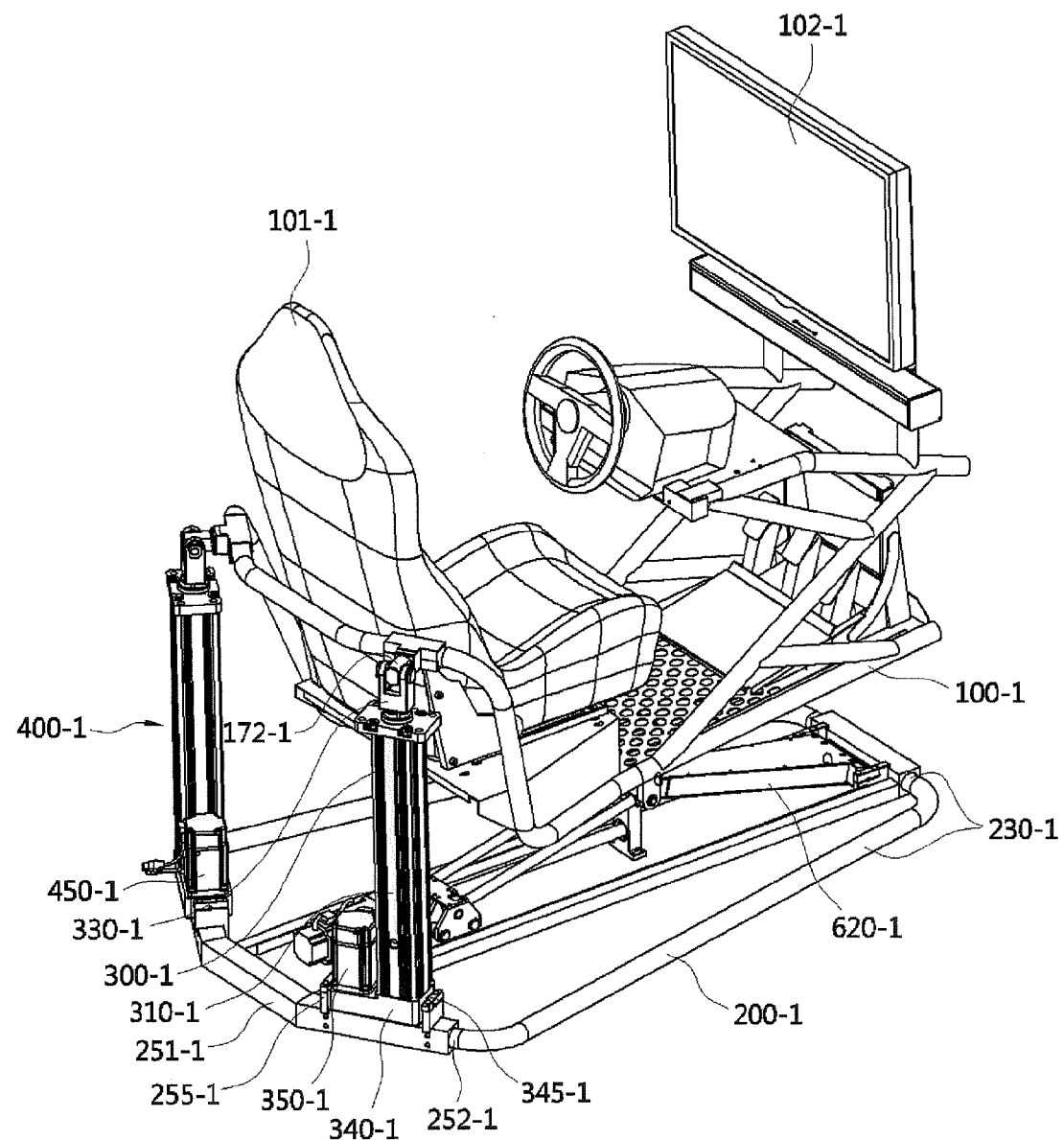
FIG. 13 is a perspective view of a motion simulator according to a second embodiment of the present invention.
Figure 14:
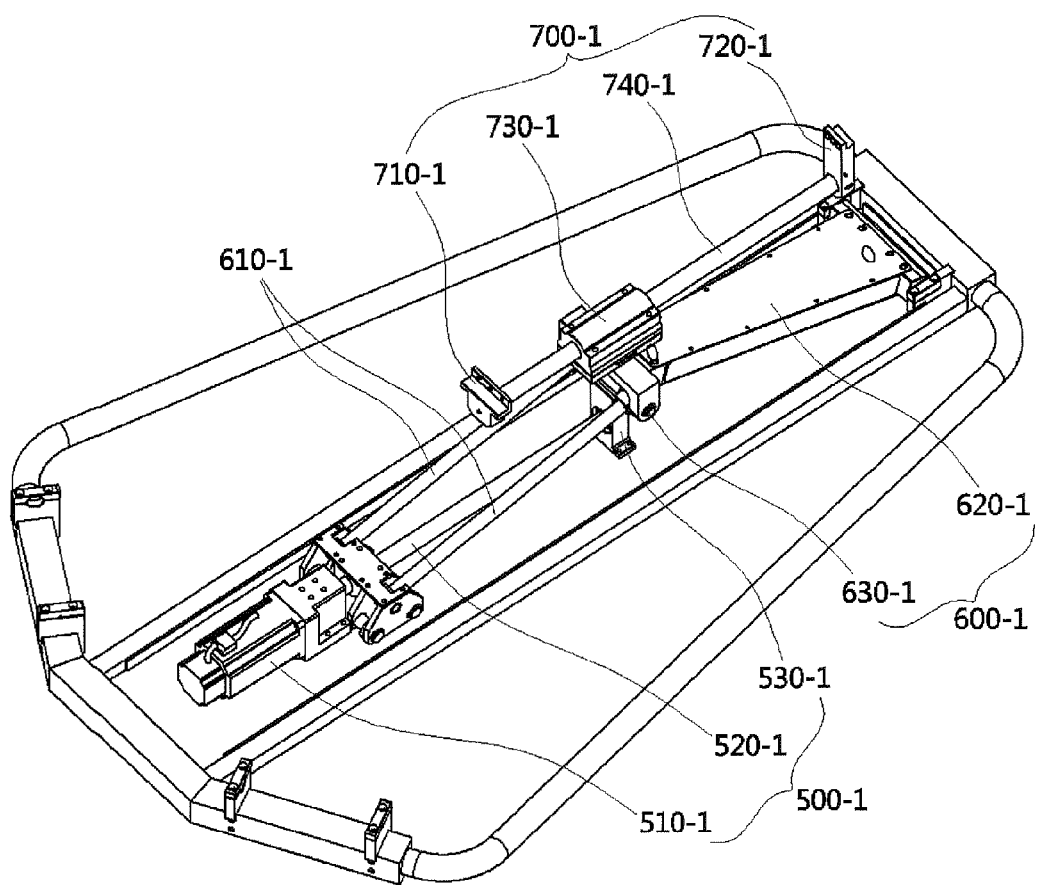
FIG. 14 is a perspective view of a state in which an upper frame, a first link portion and a second link portion are removed from the motion simulator of FIG. 13.
Figure 15:
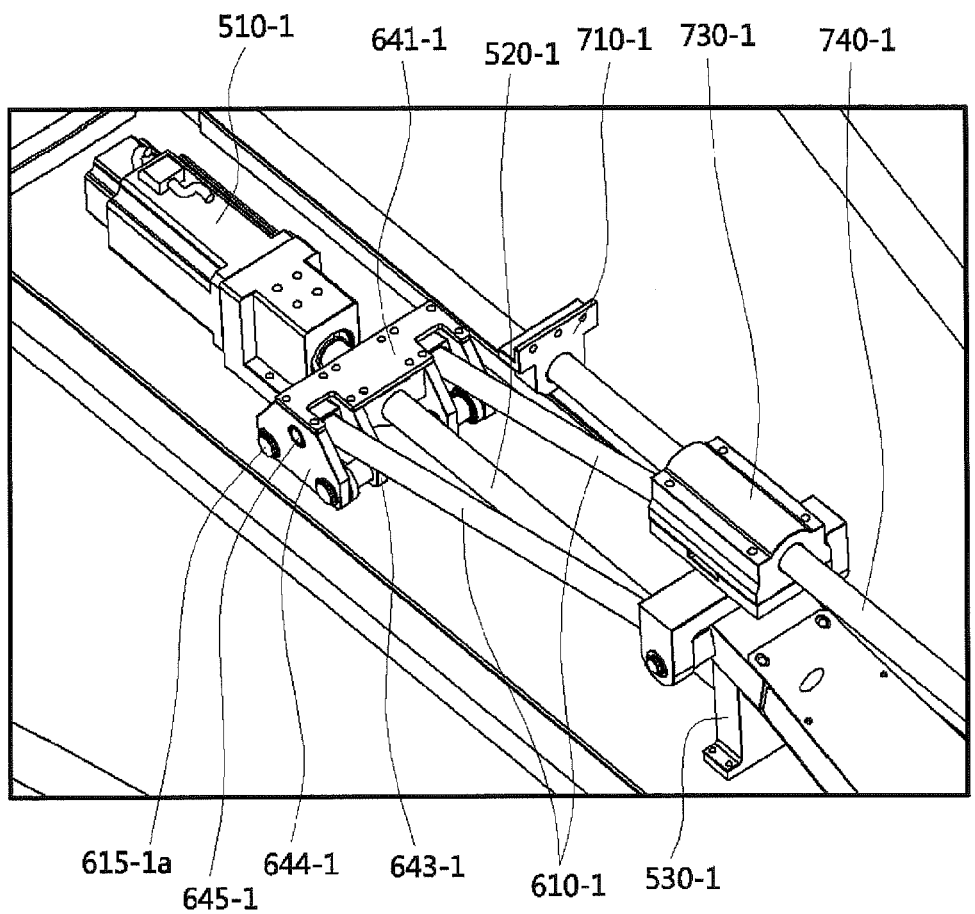
FIG. 15 is a perspective view of a third link portion and a slide portion of the motion simulator of FIG. 13.
Figure 16:
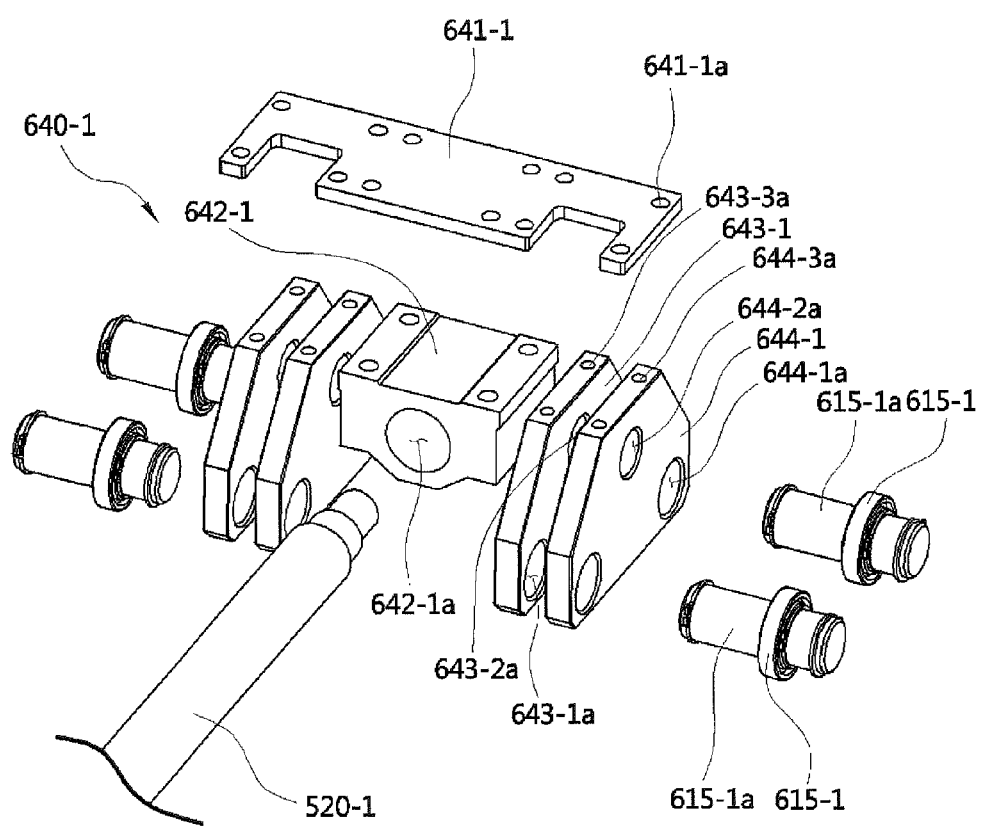
FIG. 16 is an exploded perspective view of a moving body of the motion simulator of FIG. 13.
Figure 17:
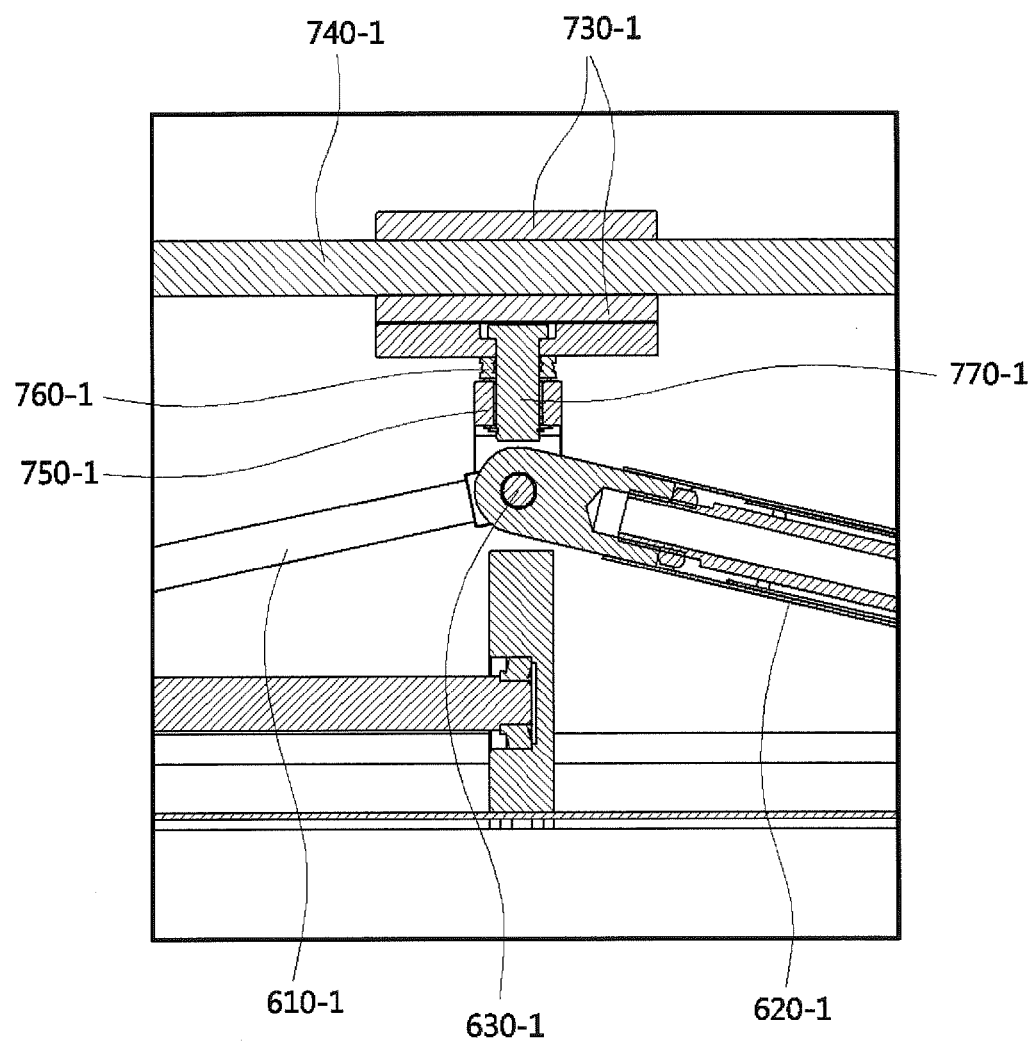
FIG. 17 is a cross-sectional view of the slide portion of the motion simulator of FIG. 13.

FIG. 11 illustrates that the second driving unit does not operate but the first driving unit operates and thus the first rod 320 is moved up and the second rod 420 is placed in a bottommost position, and FIG. 12 illustrates that the first driving unit does not operate but the second driving unit operates and thus the second rod 420 is moved up and the first rod 320 is placed in the bottommost position. In this state, the upper frame 100 is inclined to the left or right.

In FIGS. 9 through 12, when the position of the moving link member 610 is changed into the forward/backward position by the third driving unit 500, the moving roller 615 rotates along the top surface of the bottom support portion 211 and is moved so that smooth movement can be performed.

Also, the slide moving member 730 and the slide shaft 740 can be rotated relative to each other so that an operating range of the motion simulator can be increased.

Second Embodiment

A motion simulator according to a second embodiment of the present invention will be described with reference to FIGS. 13 through 17.

The motion simulator according to the second embodiment is different from the motion simulator according to the first embodiment in configurations of the first link portion 300 and a first link portion 300-1, the second link portion 400 and a second link portion 400-1, the third link portion 600 and a third link portion 600-1, the slide portion 700 and a slide portion 700-1, and a moving body 640-1, and the other configurations thereof are the same and thus, only the different configurations will be described.

The first link portion 300-1 includes a first link member 310-1 having a predetermined length in the vertical direction, a first rod 320-1 that slides inside the first link member 310-1 using a first driving unit 350-1, and a first link portion connection member 330-1 connected to an upper portion of the first rod 320-1 so as to perform pitching rotation around a first link portion connection pin 172-1.

A bottom end of the first link member 310-1 is coupled to a first link portion bottom-end connection member 340-1, and the first link portion bottom-end connection member 340-1 is connected to hinge shaft support members 255-1 in a hinge structure so as to perform pitching rotation around a hinge shaft 345-1.

The first link portion bottom end connection member 340-1 has an approximately rectangular pillar shape, and one side of the hinge shaft 345-1 is coupled to each of both ends of the first link portion bottom end connection member 340-1, and the other side of the hinge shaft 345-1 is rotatably coupled to each of the hinge shaft support members 255-1. The hinge shaft support members 255-1 are fixedly coupled to a lower frame 200-1.

The first driving unit 350-1 is coupled to an upper portion of the first link portion bottom end connection member 340-1 to be adjacent to the first link member 310-1.

According to the above-described structure, pitching rotation of the first link portion bottom-end connection member 340-1, the first driving unit 350-1 and the first link portion 300-1 is integrally performed around the hinge shaft 345-1.

The second link portion 400-1 includes a second link member 410-1 having a predetermined length in the vertical direction, a second rod 420-1 that slides inside the second link member 410-1 using a second driving unit (450-1 of FIG. 18), and a second link portion connection member 430-1 connected to an upper portion of the second rod 420-1 so as to perform pitching rotation around a second link portion connection pin 182-1.

A bottom end of the second link member 410-1 is connected to the lower frame 200-1 in a hinge structure so that pitching rotation of the second link member 410-1 can be performed.

The second link portion 400-1 has the same configuration as that of the first link portion 300-1 except for a direction in which pitching rotation is performed, and thus, detailed descriptions thereof will be omitted.

The third link portion 600-1 includes a moving link member 610-1 that is moveable in the forward/backward direction using a third driving unit 500-1 and a fixed link member 620-1 connected to the moving link member 610-1.

In order to provide a transferring force in the forward/backward direction to a rear end of the moving link member 610-1, the third driving unit 500-1 includes a motor 510-1 that provides a rotational driving force, a screw 520-1 that is rotated by the rotational driving force of the motor 510-1 and has a screw thread formed on an outer circumferential surface of the screw 520-1 in the longitudinal direction, and a screw support member 530-1 that rotatably supports a front end of the screw 520-1. When the screw 520-1 is rotated by the motor 510-1, the moving body 640-1 moves in the forward/backward direction.

The moving body 640-1 includes a moving body coupling plate 641-1, a screw coupling body 642-1, a first moving body support member 643-1, a second moving body support member 644-1, a moving roller 615-1, and a connection pin 615-1$a$.

The moving body coupling plate 641-1 has a flat plate shape, and a plurality of fastening holes 641-1$a$ are formed through the moving body coupling plate 641-1 in the vertical direction.

The screw coupling body 642-1 has an approximately hexahedral shape, and a fastening hole through which the moving body coupling plate 641-1 is coupled to the screw coupling body 642-1 using a fastening member (not shown), is formed in a top surface of the screw coupling body 642-1. A through hole 642-1$a$ through which the screw 520-1 passes, is formed in the screw coupling body 642-1 in the forward/backward direction, and an inner circumferential surface of the through hole 642-1$a$ and an inner circumferential surface of the screw 520-1 are engaged with each other by a screw thread.

The first moving body support member 643-1 and the second moving body support member 644-1 each have a hexagonal shape including plates having a predetermined thickness, and hinge shaft through holes 643-2$a$ and 644-2$a$ through which a hinge shaft 645-1 passes, and connection pin through holes 643-1$a$ and 644-1$a$ through which the connection pin 615-1$a$ passes, are formed in the first moving body support member 643-1 and the second moving body support member 644-1. A top surface of the first moving body support member 643-1 and a top surface of the second moving body support member 644-1 are coupled into the fastening hole 641-1$a$ of the moving body coupling plate 641-1 on a bottom surface of the moving body coupling plate 641-1 using the fastening member. The first moving body support member 643-1 and the second moving body support member 644-1 are provided at both sides of the screw coupling body 642-1.

The first moving body support member 643-1 and the second moving body support member 644-1 are spaced a predetermined distance apart from each other, and a rear end portion of the moving link member 610-1 is formed in the separation space.

The rear end portion of the moving link member 610-1 is hinged to the hinge shaft 645-1. Both ends of the hinge shaft 645-1 pass through the hinge shaft through holes 643-2$a$ and 644-2$a$, and an intermediate part of the hinge shaft 645-1 is hinged to the moving link member 610-1. Thus, pitching rotation of the moving link member 610-1 is performed around the hinge shaft 645-1.

A center of the hinge shaft 645-1 and a center of the screw 520-1 are located at the same height, as in the first embodiment.

Both ends of the connection pin 615-1$a$ are inserted into the connection pin through holes 643-1$a$ and 644-1$a$, and the moving roller 615-1 in a state in which it is inserted into the connection pin 615-1$a$, is provided in a separation space between the first moving body support member 643-1 and the second moving body support member 644-1.

A pair of moving rollers 615-1 are respectively provided at both ends of the moving body 640-1 and prevents rotation of the moving body 640-1 in the left/right direction caused by rotation of the screw 520-1, and when the moving body 640-1 moves in the forward/backward direction, the moving roller 615-1 rotates in contact with a top surface of the bottom support portion 211 of the first bottom support frame 210.

Front and rear ends of the moving link member 610-1 having a shape of a rod having a predetermined length in the forward/backward direction are hinged to each other. A pair of moving link members 610-1 may be spaced apart from each other.

One end of the fixed link member 620-1 having an approximately trapezoidal shape is connected to the moving link member 610-1 by a pin 630-1 in a hinge manner, and the position of the hinge-connected portion of the fixed link member 620-1 is changed into the forward/backward direction, and the other end of the fixed link member 620-1 is connected to the lower frame 200-1 in a hinge manner and thus, the position of the fixed link member 620-1 in the forward/backward direction is fixed. Thus, pitching rotation of the fixed link member 620-1 can be performed around a portion connected to the lower frame 200-1.

The slide portion 700-1 is provided to allow the connection portion of the moving link member 610-1 and the fixed link member 620-1 to slide in the forward/backward direction and includes a first slide support member 710-1, a second slide support member 720-1, a slide moving member 730-1, and a slide shaft 740-1.

The first slide support member 710-1 and the second slide support member 720-1 are coupled to a bottom surface of an upper frame 100-1 and are spaced apart from each other in the forward/backward direction, and front and rear ends of the slide shaft 740-1 are coupled to the first slide support member 710-1 and the second slide support member 720-1, respectively.

When the slide shaft 740-1 passes through the slide moving member 730-1, and the connection portion of the moving link member 610-1 and the fixed link member 620-1 is moved in the vertical direction or the forward/backward direction, the slide moving member 730-1 is guided by the slide shaft 740-1 so that forward/backward slide movement can be performed.

A connection pin 770-1, a bearing 760-1, and a slide portion support member 750-1 are provided below the slide moving member 730-1.

A head portion having a larger diameter than that of a body of the connection pin 770-1 is formed at a top end of the connection pin 770-1, and the head portion of the connection pin 770-1 is hung in the slide moving member 730-1 so that the connection pin 770-1 is prevented from escaping from the slide moving member 730-1. Thus, yawing rotation of all of the slide moving member 730-1, the slide shaft 740-1 and the upper frame 100-1 provided above the connection pin 770-1 can be performed in the horizontal direction when the connection pin 770-1 is used as a center of rotation.

A lower portion of the connection pin 770-1 is provided to pass the slide portion support member 750-1 from upwards to downwards, and a snap ring is coupled to the passed bottom end of the connection pin 770-1 so that the connection pin 770-1 can be prevented from escaping from the slide portion support member 750-1.

An operation of the motion simulator according to the second embodiment of the present invention will be described with reference to FIGS. 18 through 22.

Figure 18:
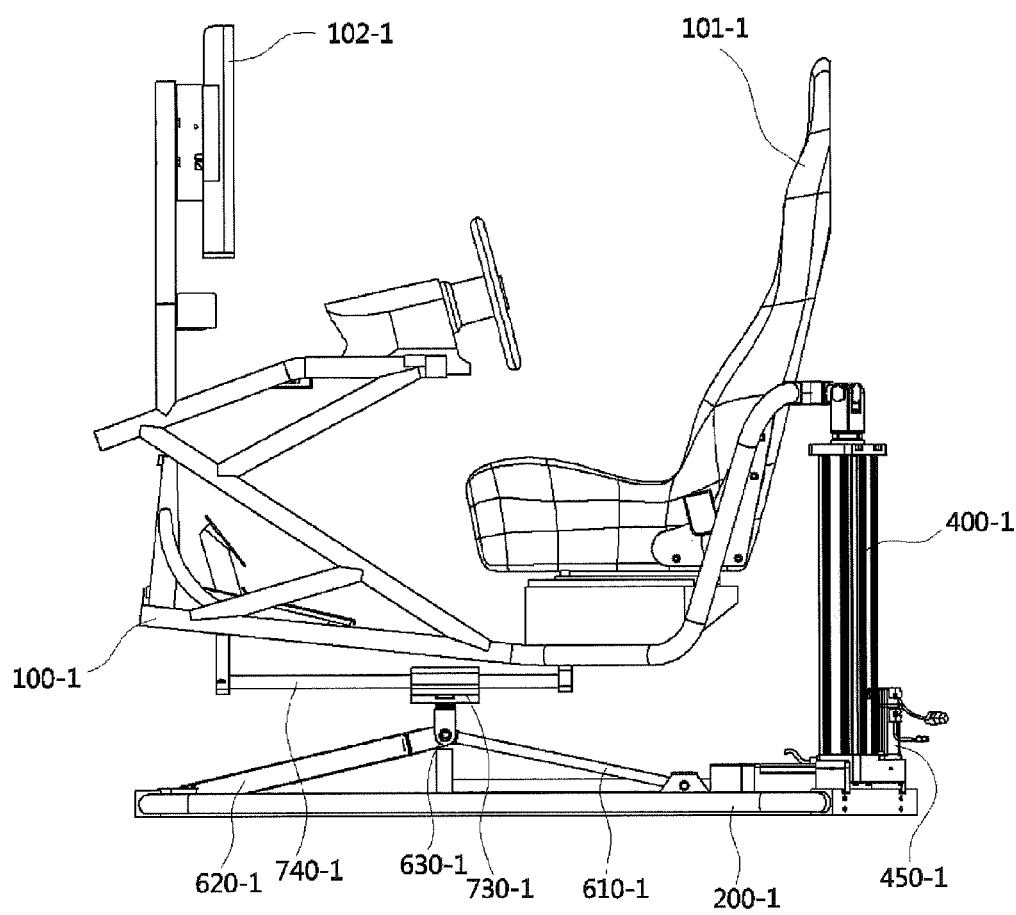
FIG. 18 is a view of a state before the first through third link portions of the motion simulator of FIG. 13 operate.

FIG. 18 illustrates the same operating state as that of FIG. 8. Because the first driving unit 350-1 and the second driving unit 450-1 do not operate, the first rod 320-1 and the second rod 420-1 are not moved up but are placed in the bottommost position, and the connection portion of the moving link member 610-1 and the fixed link member 620-1 is placed in the bottommost position.

Figure 19:
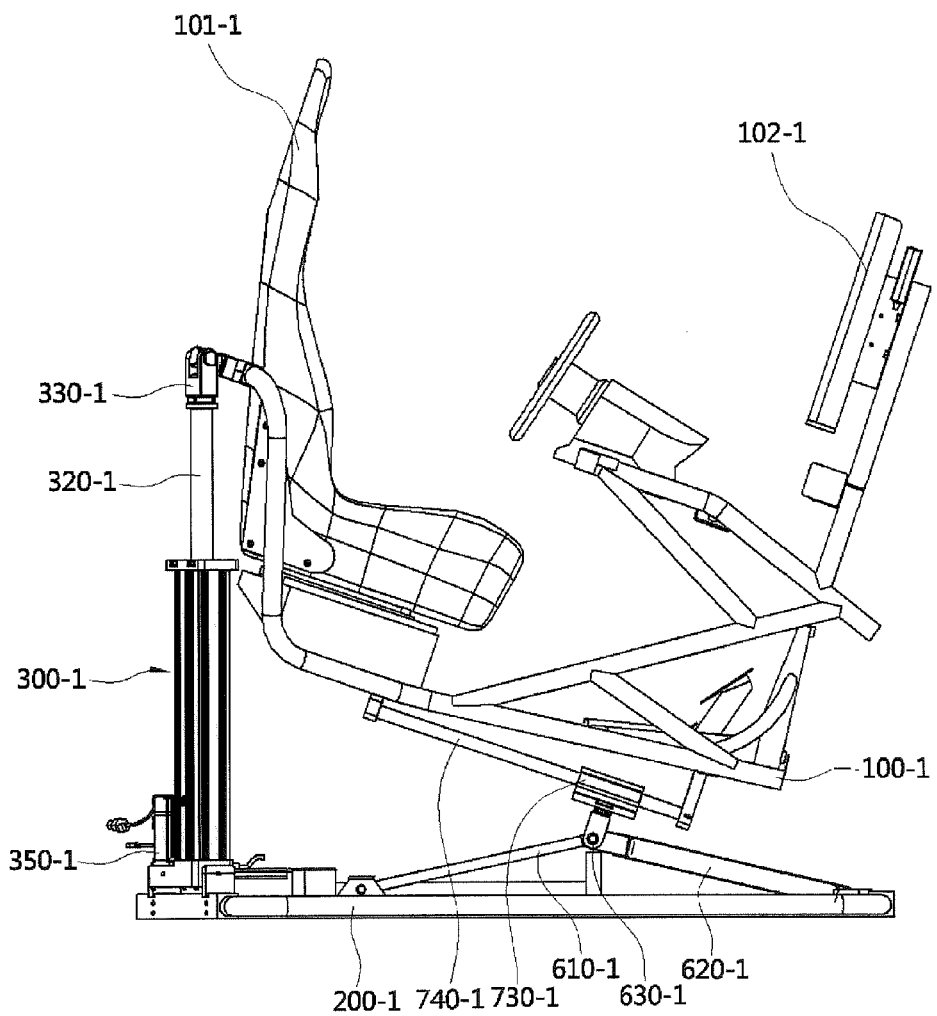
FIG. 19 is a view of a state in which the rear of the upper frame is lifted by a first driving unit and a second driving unit of the motion simulator of FIG. 13.

FIG. 19 illustrates the same operating state as that of FIG. 9. When the first driving unit 350-1 and the second driving unit 450-1 operate and the first rod 320-1 and the second rod 420-1 are moved up from the position of FIG. 18, the rear of the upper frame 100-1 and the rear of a chair 101-1 loaded on the upper frame 100-1 are lifted. In this case, when the third driving unit 500-1 operates and the position of the moving link member 610-1 is adjusted, an angle of inclination of the upper frame 100-1 may be adjusted. The slide moving member 730-1 is slid along the slide shaft 740-1 and is placed ahead compared to the position of FIG. 18.

Figure 20:
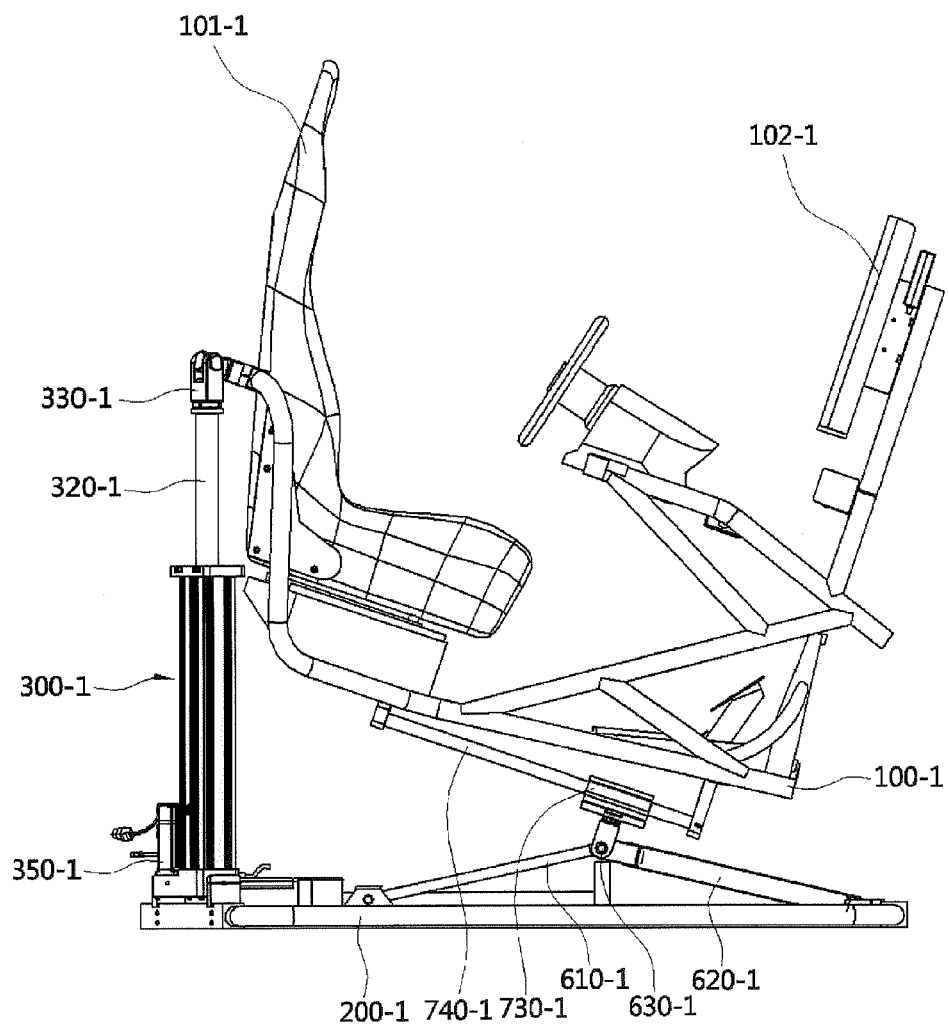
FIG. 20 is a view of a state in which the front of the upper frame is lifted by a third driving unit of the motion simulator of FIG. 13.

FIG. 20 illustrates the same operating state as that of FIG. 10. When the first rod 320-1 and the second rod 420-1 are not moved up but are placed in the bottommost position and the motor 510-1 is driven and the moving link member 610-1 is moved in the forward direction, the connection portion of the moving link member 610-1 and the fixed link member 620-1 is moved up, and the front of the upper frame 100-1 is lifted. In this case, the slide moving member 730-1 is slid along the slide shaft 740-1 and is placed backwards compared to the position of FIG. 18.

Figure 21:
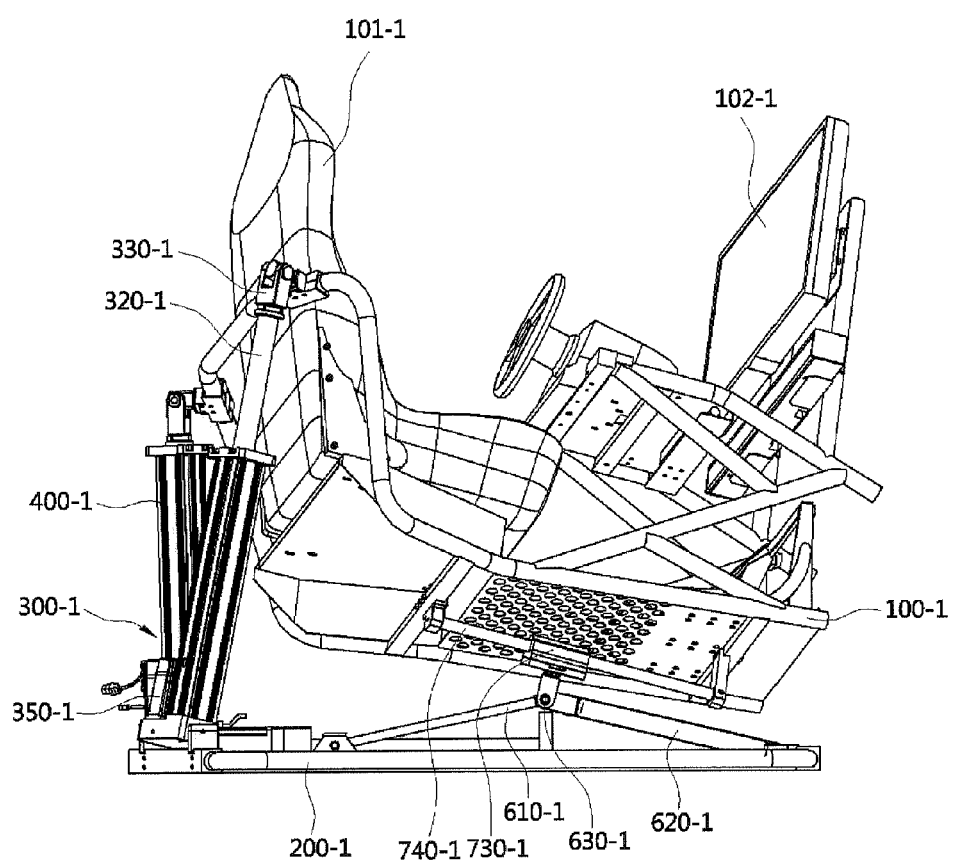
FIG. 21 is a view of a state in which a first rod is moved up by the first driving unit of the motion simulator of FIG. 13 and the upper frame is inclined to the left.
Figure 22:
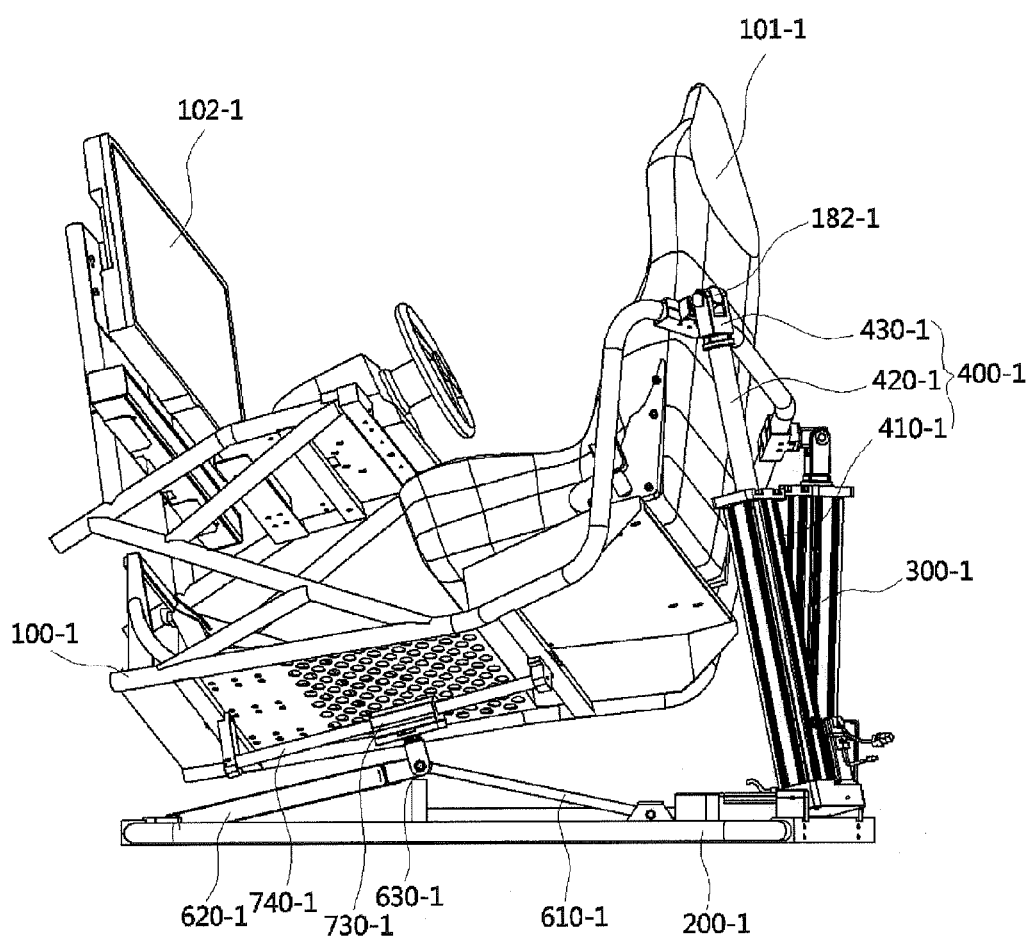
FIG. 22 is a view of a state in which a second rod is moved up by the second driving unit of the motion simulator of FIG. 13 and the upper frame is inclined to the right.

FIG. 21 illustrates that the second driving unit does not operate, the first driving unit 350-1 operates, the first rod 320-1 is moved up and the second rod 420-1 is placed in the bottommost position, and FIG. 22 illustrates that the first driving unit 350-1 does not operate, the second driving unit 450-1 operates, the second rod 420-1 is moved up and the first rod 320-1 is placed in the bottommost position. In this state, the upper frame 100-1 is inclined to the left or right.

Because rolling rotation of the slide moving member 730-1 can be performed around the slide shaft 740-1, as illustrated in FIGS. 21 and 22, the upper frame 100-1 can be inclined to the left or right.

Third Embodiment

Figure 23:
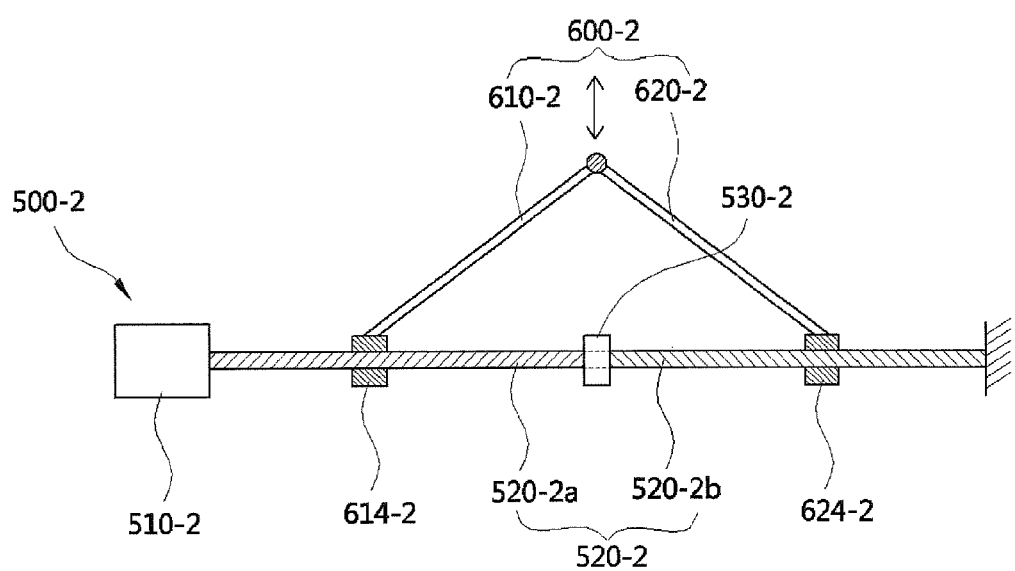
FIG. 23 is a view of a third driving unit and a third link portion of a motion simulator according to a third embodiment of the present invention.
Figure 24:
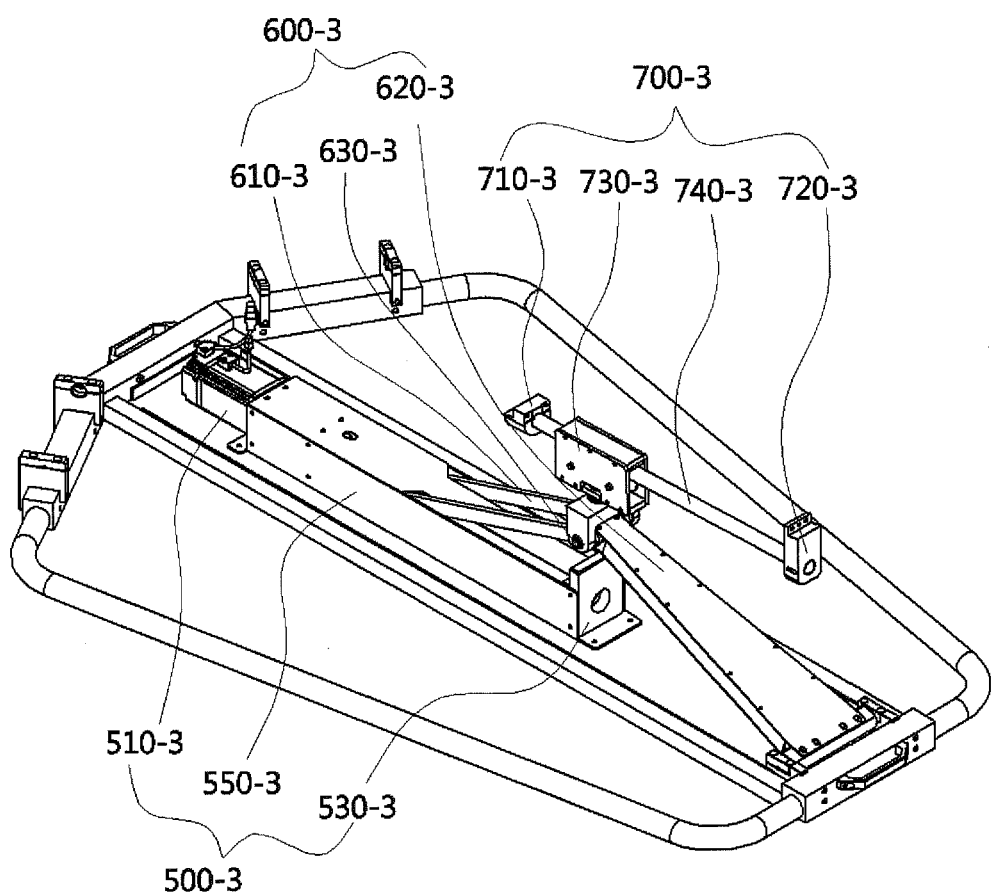
FIG. 24 is a perspective view of a third driving unit, a third link portion and a slide portion of a motion simulator according to a fourth embodiment of the present invention.
Figure 25:
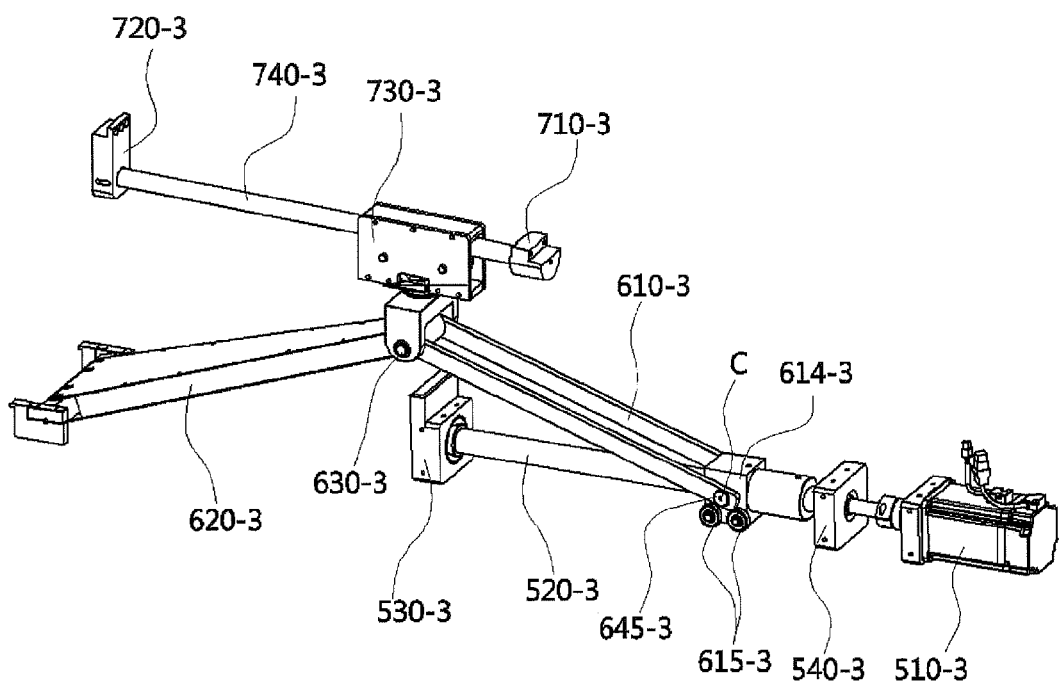
FIG. 25 is a perspective view of a third driving unit cover removed from the motion simulator of FIG. 24 at a different angle from that of FIG. 24.
Figure 26:
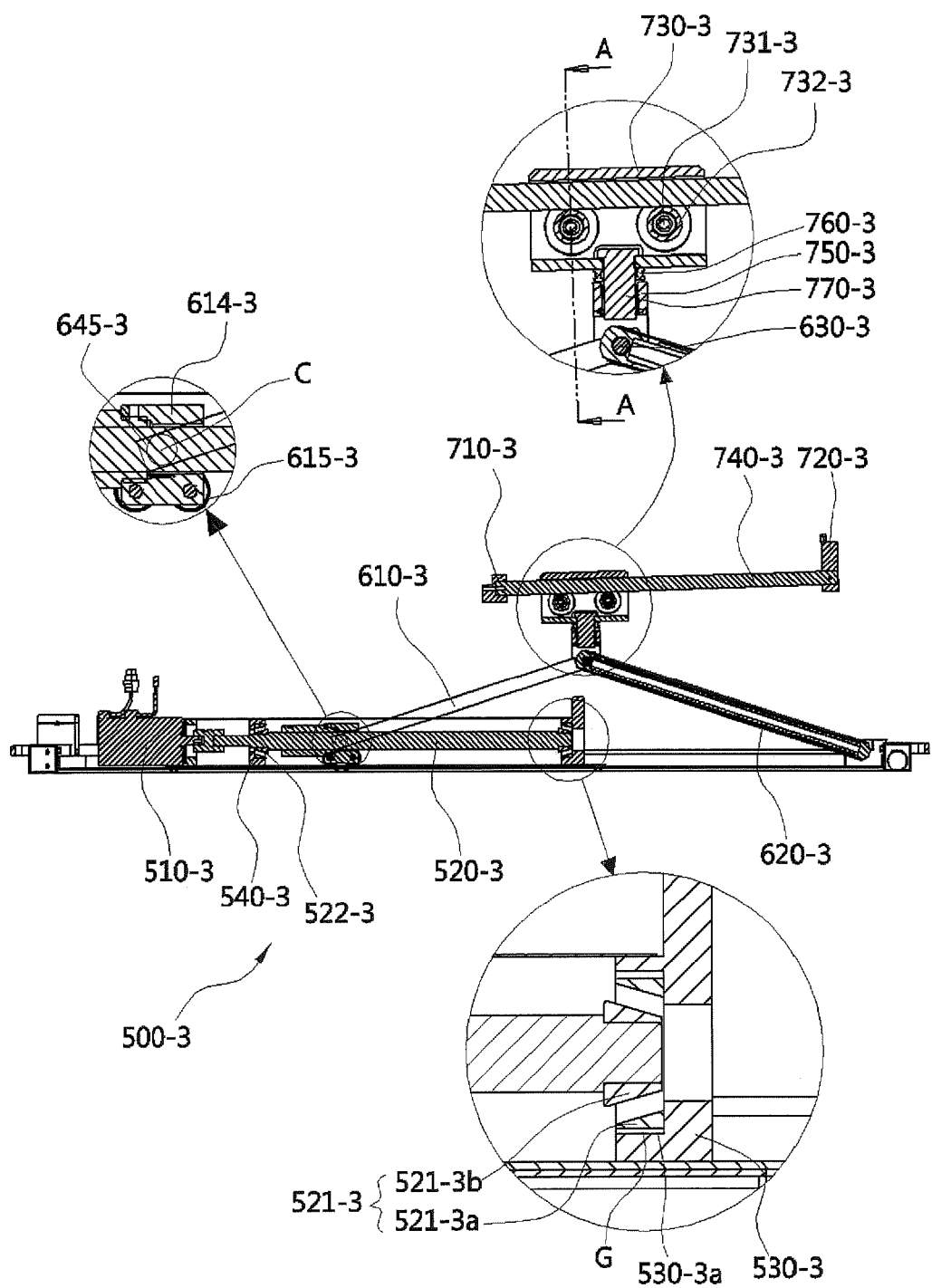
FIG. 26 is a cross-sectional view of the third driving unit, the third link portion and the slide portion of the motion simulator of FIG. 24.
Figure 27:
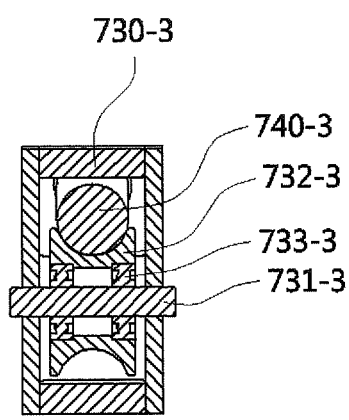
FIG. 27 is a cross-sectional view taken along line A-A of FIG. 26.

A motion simulator according to a third embodiment of the present invention will be described with reference to FIG. 23.

In the first and second embodiments, the moving link members 610 and 610-1 having both front and rear ends that move in the forward/backward direction, and the fixed link members 620 and 620-1 having rear ends that move in a state in which front ends are fixed, are provided.

Contrary to this, a third link portion 600-2 of the third embodiment includes a first moving link member 610-2 and a second moving link member 620-2 of which a front end also moves, instead of the fixed link members 620 and 620-1.

A screw 520-2 is connected to a motor 510-2. The screw 520-2 includes a first screw portion 520-2a and a second screw portion 520-2b. The first screw portion 520-2a and the second screw portion 520-2b include one connection body, and directions of screw threads formed on outer circumferential surfaces of the first screw portion 520-2a and the second screw portion 520-2b are opposite to each other.

The connection portion of the first screw portion 520-2a and the second screw portion 520-2b is provided to pass through a screw support member 530-2, and a first moving body 614-2 is coupled to the first screw portion 520-2a through the screw thread, and a second moving body 624-2 is coupled to the second screw portion 520-2b through the screw thread.

A front end of the second screw portion 520-2b is rotatably supported.

An end of the first moving link member 610-2 is hinged to the first moving body 614-2, and an end of the second moving link member 620-2 is hinged to the second moving body 624-2. A connection portion of the first moving link member 610-2 and the second moving link member 620-2 is also connected in a hinge structure.

When, in this connection state, the motor 510-2 is rotated in one direction, the first screw portion 520-2a and the second screw portion 520-2b are rotated together, and the first moving body 614-2 and the second moving body 624-2 are moved closer to each other. Thus, the connection portion of the first moving link member 610-2 and the second moving link member 620-2 is moved in the upward direction, and the upper frame 100-1 is lifted in the upward direction.

Contrary to this, when the motor 510-2 is rotated in an opposite direction, the first moving body 614-2 and the second moving body 624-2 are moved to be spaced apart from each other. Thus, the connection portion of the first moving link member 610-2 and the second moving link member 620-2 is moved in the downward direction, and the upper frame 100 is lowered in the downward direction.

Fourth Embodiment

A motion simulator according to a fourth embodiment of the present invention will be described with reference to FIGS. 24 through 27.

The motion simulator according to the fourth embodiment is different from the motion simulator according to the first embodiment in configurations of the third driving unit 500 and a third driving unit 500-3, the third link portion 600 and a third link portion 600-3, the slide portion 700 and a slide portion 700-3, and the other configurations thereof are the same and thus only the different configurations will be described.

The third driving unit 500-3 includes a motor 510-3 that provides a rotational driving force, a screw 520-3 that is rotated by the rotational driving force of the motor 510-3 and has a screw thread formed on an outer circumferential surface of the screw 520-3 in the longitudinal direction, and a first screw support member 530-3 and a second screw support member 540-3 that rotatably support the front and the rear of the screw 520-3. An outside of the screw 520-3 is surrounded by a third driving unit cover 550-3.

A bearing 521-3 is coupled to a front end of the screw 520-3. The bearing 521-3 is mounted on a groove-shaped bearing mounting portion 530-3a formed at the first screw support member 530-3. Also, a bearing mounting portion is formed at the second screw support member 540-3, and a bearing 522-3 coupled to the screw 520-3 is mounted on the bearing mounting portion. Each of the bearings 521-3 and 522-3 includes an outer wheel 521-3a, an inner wheel 521-3b, and a roller (not shown) therebetween.

A load is applied to the screw 520-3 to which a moving link member 610-3 is connected, while the motion simulator operates. When the bearing 521-3 coupled to the end of the screw 520-3 is coupled to the bearing mounting portion 530-3a to be in close contact with an inside surface of the bearing mounting portion 530-3a without any clearance, due to the load applied to the screw 520-3, deformation of the screw 520-3 may occur. That is, due to a processing tolerance of components, a bottom surface of a moving roller 615-3 does not contact the floor but is spaced apart from the floor, and in this state, both ends of the screw 520-3 are supported by the first screw support member 530-3 and the second screw support member 540-3 at a predetermined height so that a portion in which a moving body 614-3 is placed, of the screw 520-3 is deformed due to a load.

In order to prevent the problem, a cross-section of the bearing mounting portion 530-3a is formed as a long hole in the vertical direction so that vertical displacement of the screw 520-3 can be absorbed. That is, as illustrated in the enlarged portion of FIG. 26, a separation space G is formed between a top end portion (bottom end portion) of the outer wheel 521-3a of the bearing 521-3 and a top surface (bottom surface) of the bearing mounting portion 530-3a, and a lateral portion of the outer wheel 521-3a of the bearing 521-3 and sides of the bearing mounting portion 530-3a are in contact with each other without any separation space. Thus, even if the screw 520-3 sags due to the load, vertical displacement of the screw 520-3 is absorbed in the separation space G so that the deformation of the screw 520-3 can be prevented.

A separation space may be formed between a bearing mounting portion of the second screw support member 540-3 and the bearing 522-3.

The third link portion 600-3 includes the moving link member 610-3, a fixed link member 620, a pin 630-3, and the moving body 614-3.

A rear end of the moving link member 610-3 is hinged to the moving body 614-3 by a hinge shaft 645-3. Four moving rollers 615-3 are provided at both sides of the moving body 614-3. A center C of the hinge shaft 645-3 and a center of the screw 520-3 are placed at the same height from the ground so that an excessive force between the moving roller 615-3 and the floor surface is prevented from occurring and smooth movement of the moving roller 615-3 can be performed.

The slide portion 700-3 includes a first slide support member 710-3, a second slide support member 720-3, a slide moving member 730-3, and a slide shaft 740-3.

Front and rear ends of the slide shaft 740-3 are coupled to the first slide support member 710-3 and the second slide support member 720-3, respectively.

The slide moving member 730-3 has a shape of a rectangular pillar of which front and rear surfaces are opened, and the slide shaft 740-3 passes through the opened front and rear surfaces of the slide moving member 730-3.

The slide shaft 740-3 is supported by a plurality of slide rollers 732-3 that are spaced apart back and forth from each other in the longitudinal direction of the slide shaft 740-3. Because the slide rollers 732-3 are rotatably coupled to each other by a roller pin 731-3, slide movement is performed in the forward/backward direction in a state in which the slide shaft 740-3 is in contact with a top surface of the slide roller 732-3. According to this structure, the forward/backward motion between the slide shaft 740-3 and the slide roller 732-3 can be performed in a stable state.

A bearing 733-3 is interposed between the slide roller 732-3 and the roller pin 731-3.

Because the slide roller 732-3 has a concave groove-shaped portion on which the slide shaft 740-3 is mounted, the slide shaft 740-3 is surrounded in such a way that left and right sides from a bottom end of the slide shaft 740-3 are surrounded. Thus, stable slide movement can be performed.

A connection pin 770-3, a bearing 760-3, and a slide portion support member 750-3 are provided below the slide moving member 730-3, as in the second embodiment.

As described above, in a motion simulator according to the present invention, the motion simulator is manufactured to have a small size so that an occupied area can be reduced and thus operation costs of the motion simulator can be reduced.

In addition, a center of a hinge shaft connected to an end of a moving link member and a center of a screw are located at the same height from the ground so that an excessive frictional force between a moving roller and a floor surface can be prevented from occurring and smooth movement of the moving roller can be performed.

In addition, a separation space is formed in a screw support member that supports an end of the screw so that vertical displacement of the screw can be absorbed and deformation of the screw caused by a load can be prevented.

In addition, a slide shaft is supported by a slide roller so that stable slide movement in a forward/backward direction can be performed.

In addition, a first link portion and a second link portion are inclined at an acute angle with respect to a central line of the simulator having a length in the forward/backward direction so that, when pitching rotation of an upper frame is performed, the second link portion supports the first link portion not to fall in a forward direction and the first link portion supports the second link portion not to fall in the forward direction and thus although there is no additional support structure, a non-falling stable structure can be implemented.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A motion simulator comprising:
   an upper frame configured to have a chair on which a user sits;
   a lower frame configured to have a bottom surface supported on a floor;
   a first link portion configured to have a bottom end hinged to one side of a rear end of the lower frame and a top end connected to one side of a rear end of the upper frame so that pitching rotation of the upper frame is performed, and to move one side of the rear end of the upper frame in a vertical direction using a first driving unit;
   a second link portion configured to have a bottom end hinged to the other side of the rear end of the lower frame and a top end connected to the other side of the rear end of the upper frame so that pitching rotation of the upper frame is performed, and to move the other side of the rear end of the upper frame in the vertical direction using a second driving unit;
   a third driving unit configured to be provided on the lower frame; and
   a third link portion configured to support a lower portion of the upper fame so that pitching and rolling rotation of the upper frame is performed, and to move the upper frame in the vertical direction using the third driving unit,
   wherein a slide portion is provided between the third link portion and the lower portion of the upper fame so that a connection portion of the third link portion and the upper frame makes slide movement in the forward/backward direction.

2. The motion simulator of claim 1, wherein the third driving unit is provided on the lower frame and provides a transferring force in a forward/backward direction, and the third link portion comprises a moving link member having a bottom end hinged to the third driving unit so that one end of the moving link member is movable in the forward/backward direction using the third driving unit, and a fixed link member having one end hinged to the moving link member and the other end hinged to the lower frame, and a connection portion of the moving link member and the fixed link member supports the lower portion of the upper frame, and a vertical motion of the upper frame is performed by forward/backward movement of the moving link member.

3. The motion simulator of claim 2, wherein the third driving unit comprises a motor providing a rotational driving force, a screw that is rotated by driving of the motor and has a screw thread formed on an outer circumferential surface of the screw in a longitudinal direction, and a screw support member rotatably supporting an end of the screw, and a moving body is provided in such a way that a screw thread is formed on an inner circumferential surface through which the screw passes, and moves in the forward/backward direction according to rotation of the screw, and a front end of the moving link member is hinged to the fixed link member so that pitching rotation of the moving link member is performed, and a rear end of the moving link member is hinged to the moving body so that pitching rotation of the moving link member is performed.

4. The motion simulator of claim 3, wherein the moving body and the moving link member are hinged to each other by a hinge shaft, and a moving roller that rotates in contact with the lower frame when the moving roller moves in the forward/backward direction, is coupled to the moving body.

5. The motion simulator of claim 4, wherein a center of the hinge shaft is located at the same height as a center of the screw.

6. The motion simulator of claim 3, wherein a separation space in a vertical direction is formed in the screw support member so that vertical displacement of an end of the screw is absorbed in the separation space.

7. The motion simulator of claim 1, wherein the third driving unit is provided on the lower frame, provides a transferring force in a forward/backward direction, comprises a screw including a first screw portion and a second screw portion of which directions of screw threads formed on outer circumferential surfaces of the first and second screw portions are opposite to each other, and a motor for rotating the screw, and the third link portion comprises a first moving link member including a first moving body and a second moving body coupled to the first screw portion and the second screw portion through the screw threads, a bottom end of the first moving link member hinged to the first moving body, and a second moving link member having a bottom end hinged to the second moving body, and a connection portion of the first moving link member and the second moving link member supports the lower portion of the upper frame, and when the screw is rotated by the motor, the first moving body and the second moving body are close to each other or spaced apart from each other so that a vertical motion of the upper frame is performed.

8. The motion simulator of claim 1, wherein the slide portion comprises:
   a first slide support member and a second slide support member configured to be spaced apart from each other in the forward/backward direction and to be coupled to the lower portion of the upper frame;
   a rod-shaped slide shaft configured to connect the first slide support member and the second slide support member; and
   a slide moving member, which is provided between the first slide support member and the second slide support member, through which the slide shaft passes, and which is guided by the slide shaft according to forward/backward and vertical movement of the third link portion and moves in the forward/backward direction.

9. The motion simulator of claim 8, wherein a ball joint is provided between the slide moving member and the slide shaft so that the slide moving member is freely rotated.

10. The motion simulator of claim 8, wherein the slide shaft is supported by a slide roller that rotates when slide movement in the forward/backward direction is performed.

11. The motion simulator of claim 10, wherein a plurality of slide rollers are provided in the longitudinal direction of the slide shaft.

12. The motion simulator of claim 10, wherein the slide roller has a concave groove-shaped portion on which the slide shaft is mounted.

13. The motion simulator of claim 1, wherein the first link portion and the second link portion are inclined at an acute angle with respect to a simulator central line having a length in the forward/backward direction.

* * * * *